(12) United States Patent  (10) Patent No.: US 7,094,267 B2
Inayama  (45) Date of Patent: Aug. 22, 2006

(54) AIR CLEANER AND AIR INTAKE STRUCTURES FOR LOW-DECK VEHICLE

(75) Inventor: Yoichi Inayama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 146 days.

(21) Appl. No.: 10/672,344

(22) Filed: Sep. 25, 2003

(65) Prior Publication Data

US 2004/0118362 A1   Jun. 24, 2004

(30) Foreign Application Priority Data

Sep. 26, 2002  (JP) .............................. 2002-281996
Sep. 26, 2002  (JP) .............................. 2002-282003

(51) Int. Cl.
  *B01D 35/30*  (2006.01)
  *F02M 35/10*  (2006.01)
  *F01P 7/10*  (2006.01)

(52) U.S. Cl. .............................. 55/385.3; 123/184.31; 123/198; 180/219

(58) Field of Classification Search ............... 55/385.3; 123/184.31, 184.32, 198 E, 579; 180/68.1, 180/219

See application file for complete search history.

(56) References Cited

U.S. PATENT DOCUMENTS 5,887,673 A * 3/1999 Matsumura et al. ........ 180/219

FOREIGN PATENT DOCUMENTS

JP       2001-88763       4/2001

* cited by examiner

*Primary Examiner*—Robert A. Hopkins
(74) *Attorney, Agent, or Firm*—Hamre, Schumann, Mueller & Larson, PC

(57) ABSTRACT

To secure a large space that can be utilized effectively above an air cleaner, a low-deck vehicle 10 is constructed to mount an engine shaped like a letter V in the fore-and-aft direction under a low-deck and an air cleaner. The air cleaner is adapted to be capable of being maintained and inspected from the side of the vehicle. A filter element is provided in the air cleaner, and is attachable and detachable by a lid member on the side of the air cleaner. An inspection lid opposing the lid member is provided on a vehicle body cover covering the air cleaner. A space for arranging vehicle accessories such as a fuel tank is provided above the air cleaner.

5 Claims, 28 Drawing Sheets

AIR CLEANER AND AIR INTAKE STRUCTURES FOR LOW-DECK VEHICLE

FIELD OF THE INVENTION

The present invention relates to an air cleaner structure and an air intake structure of an engine for a low-deck vehicle.

BACKGROUND OF THE INVENTION

In a low-deck vehicle such as a scooter-type motor cycle or motor tricycle, a technology in which an engine shaped like a letter V in the fore-and-aft direction is mounted at the lower portion of a vehicle body frame, and an air intake structure and an air cleaner structure are disposed above the engine is disclosed in JP-A-2001-88763. FIG. 28 is a schematic drawing of a low-deck vehicle which corresponds to FIG. 2 in JP-A-2001-88763. Parts shown therein are renumbered.

The low-deck vehicle 300 is a scooter-type motorcycle in which a power unit 320 is mounted in a double-cradle type vehicle body frame 310 at the position downwardly of a low-deck 318.

The vehicle body frame 310 includes a pair of left and right upper frames 312, 312 (only the left one is shown, hereinafter) extending from a head pipe 311 downward and rearward, a pair of left and right down frames 313, 313 extending downward from the head pipe 311, a pair of left and right center frames 314, 314 extending from the midsections of the down frames 313, 313 rearward and upward, a pair of left and right lower frames 315, 315 extending from the lower ends of the down frames 313, 313 toward the rear, and a pair of left and right rear frames 316, 316 for connecting the rear ends of the lower frames 315, 315 and the rear ends of the center frames 314, 314.

The rear ends of the upper frames 312, 312 are connected to the midsections of the center frames 314, 314. The low-deck 318 can be supported by the vehicle body frame 310. The low-deck 318 is a floor on which legs of an occupant is placed.

The power unit 320 includes an engine 321 shaped like a letter V in the fore-and-aft direction mounted at the front, and a transmission unit 331 mounted at the rear. The V-shape engine 321 is a water-cooling engine having a front cylinder 322 and a rear cylinder 323 formed so as to form a bank angle θ10 (angle θ10 between the cylinders 322 and 323) in the order of 45° in side view. The front cylinder 322 extends substantially horizontally toward the front. The rear cylinder 323 extends toward the head pipe 311. Consequently, the bank angle θ10 becomes a narrow angle in the order of 45° in side view. As a matter of course, a bisector L11 of the bank angle θ10 passes between the head pipe 311 and a front wheel 351. Reference numeral 324 designates a crankshaft.

Exhaust pipes 326, 326 connected to the respective cylinders 322, 323 extend below the engine 321 toward the rear and reach a muffler 327.

The low-deck vehicle 300 includes an air cleaner 340 disposed in a space between the head pipe 311 and the rear cylinder 323, an engine-cooling radiator 352 disposed between the engine 321 and the front wheel 351, a seat 353 disposed on top at the rear, and a front fuel tank 354 and a rear storage box 355 disposed under the seat 353.

The transmission unit 331 is provided with a power transmission unit 333 that is capable of swinging in the vertical direction about a final output shaft 332 as the swinging support end. A rear wheel 334 may be mounted to the power transmission unit 333 and the power transmission unit 333 may be suspended from the vehicle body frame 310 via a rear cushion 335. The rear cushion 335 is vertically disposed under the seat 353 between the fuel tank 354 and the storage box 355. Reference numeral L12 is a straight line passing through the head pipe 311 and the final output shaft 332.

The air cleaner 340 includes a filter element 341 in the interior thereof, an air intake port 342 on top thereof, and a lid 343 disposed on top for closing the air intake port 342. The respective cylinders 322, 323 are connected to the air cleaner 340 via air intake connecting hoses 344, 345, respectively. The air intake connecting hose 344 connected to the front cylinder 322 passes between the cylinders 322, 323 to the air cleaner 340. On the other hand, the air intake connecting hose 345 connected to the rear cylinder 323 passes over the rear cylinder 323 to the air cleaner 340.

However, the air cleaner 340 in the related art is provided with the lid 343 on top thereof. In order to attach and detach the filter element 341 disposed in the interior of the air cleaner 340, it is necessary to open the lid 343 on top. Therefore, it is not easy to secure a large space that can be used effectively above the air cleaner 340.

Accordingly, it is an object of the present invention to provide a technology to secure a large space that can be used effectively above the air cleaner.

Also, in order to secure ease of straddling the vehicle body when the driver rides on the vehicle, the vehicle body frame 310 shown in FIG. 28 is constructed in such a manner that the upper frames 312, 312 are significantly lowered toward the rear, and the rear ends thereof are joined to the midsections of the center frames 314, 314. In other words, since the upper frames 312, 312 and the center frames 314, 314 are combined into a substantially V-shape, arrangement of the engine 321 at the lower position is limited, and thus it is difficult to use a space above the engine 321 effectively while maintaining rigidity of the vehicle body frame 310. In addition, there is room for improvement regarding the relation between the vehicle body frame 310 and the air intake structure.

Accordingly, it is a further object of the present invention to provide a technology in which air can be supplied smoothly from the respective air intake structures to the respective cylinders of the V-shape engine while improving rigidity of the vehicle body frame.

SUMMARY OF THE INVENTION

In a low-deck vehicle, an air cleaner structure for a the low-deck vehicle including an engine shaped like a letter V in the fore-and-aft direction disposed below a the low-deck of the low-deck vehicle and an air cleaner disposed upwardly thereof wherein the air cleaner is constructed to be capable of being maintained and inspected from the side of the vehicle. Since the air cleanser is constructed to be capable of being maintained and inspected from the side of the vehicle, it is not necessary to perform maintenance and inspection from above the air cleaner. Therefore, a large space that can be used effectively may be secured sufficiently above the air cleaner.

The air cleaner structure further comprises a filter element in the interior of the air cleaner, and is constructed to be capable of being attached and detached by a lid member on the side of the air cleaner, and a vehicle body cover that covers the air cleaner comprising an inspection lid so as to oppose the lid member. Since the filter element disposed in the interior of the air cleaner is constructed to be capable of being attached and detached by the lid member on the side of the air cleaner, and the vehicle body cover that covers the air cleaner comprises the inspection lid so as to oppose the lid member, the filter element can be attached and detached easily from the side portion of the air cleaner by removing the inspection lid and then removing the lid member. Therefore, maintenance and inspection work for the filter element can be performed easily and thus the workability is improved.

The engine shaped like a letter V in the fore-and-aft direction is provided with air intake connecting hoses connected to the air cleaner, and the air intake connecting hoses are provided with air lines extending in the air cleaner, respectively, and a filter element is disposed between the air lines. Since the filter element is disposed between the plurality of air lines extending in the air cleaner, the filter element does not interfere with the air lines when attaching and detaching the filter element from the side of the air cleaner. Therefore, it is not necessary to increase the size of the air cleaner for preventing intervention. Consequently, the air cleaner can be downsized and thus flexibility of design in mounting the air cleaner on the vehicle is increased.

A space for disposing vehicle accessories such as fuel tank or the like is provided above the air cleaner. Since the space for disposing vehicle accessories such as fuel tank or the like is provided above the air cleaner, the vehicle accessories such as fuel tank can easily be disposed utilizing the space effectively, and flexibility in designing regarding load distribution may be increased. For example, since the center of gravity of the low-deck vehicle can be set to the front by disposing the air cleaner and the fuel tank at the front of the low-deck vehicle, the load exerted to the front wheel and the rear wheel can be distributed further suitably.

The low-deck vehicle includes the engine shaped like a letter V in the fore-and-aft direction suspended from a diamond-shaped frame including a pair of left and right upper frames extending from the head pipe downward and rearward, and a down frame extending downward from the head pipe, and an air intake connecting hose disposed between the V-shaped banks. Since the vehicle body frame is shaped like a diamond, and the V-shape engine is suspended from the diamond-shaped frame, the engine may consist part of the vehicle body frame. Therefore, it is not necessary to pass the frame member under the V-shape engine. Consequently, the V-shape engine can be lowered to the minimum level from the ground.

Since the air intake connecting hose of the engine is disposed in a large space between the V-shaped banks of the V-shape engine, the air intake connecting hose or the air cleaner may be placed collectively at the relatively low level. Therefore, a larger space may be secured above the air intake connecting hose or the air cleaner which are placed at the low level, which is advantageous for disposing the vehicle accessories such as fuel tank, whereby flexibility in designing may be increased.

In another embodiment, a low-deck vehicle comprising an engine shaped like a letter V in the fore-and-aft direction suspended by an upper frame extending from a head pipe rearward and downward and a down frame extending from the head pipe downward, and an air intake structure including air intake connecting hoses and an air cleaner disposed above the engine shaped like a letter V in the fore-and-aft direction, wherein the air intake connecting hoses are disposed between V-shaped banks of the V-shape engine, and disposed substantially along the upper frame and the down frame. Since the air intake connecting hoses are disposed between the V-shaped banks of the V-shape engine suspended from the diamond-shaped vehicle body frame, and disposed substantially along the upper frame and the down frame of the diamond shaped vehicle body frame, the air intake connecting hoses may be disposed substantially linearly. Air may be supplied smoothly from the respective air intake connecting hoses to the respective cylinders by employing the substantially linear air intake connecting hoses. As a consequence, air intake efficiency may further be improved, and the output performance of the V-shape engine may further be improved.

In addition, in this arrangement, the space inside the vehicle body frame can be utilized effectively to achieve compact arrangement, flexibility in designing may be increased, and the appearance of the low-deck vehicle may be improved. In addition, ease of straddling the vehicle body frame when the driver rides on the vehicle is improved.

Between the upper frames and the down frames facing the sides of the respective air intake connecting hoses are of a trussed frame structure. Since between the upper frames and the down frames facing the sides of the respective air intake connecting hoses are of a trussed frame structure, rigidity of the respective air intake connecting hoses of the vehicle body frame in the longitudinal direction can further be improved. Therefore, the output performance of the V-shape engine suspended by the vehicle body frame may further be improved.

The trussed frame structure includes a triangular space where the filter element of the air cleaner can be taken in and out. Since the trussed frame structure includes a triangular space where the filter element of the air cleaner can be taken in and out, the filter element can easily be attached and detached from the side of the air cleaner. Therefore, maintenance and inspection work for the filter element can easily be performed, and thus workability is improved. In addition, the compact and lightweight air cleaner is achieved.

Further, the upper frame extends substantially linearly toward the rear up to the position near the cylinder of the rear bank of the V-shape engine while inclining downward, and then extend to the position near the pivot of the rear wheel swing arm with less inclination. Since the upper frame extends from the head pipe substantially linearly toward the rear up to the position near the cylinder of the rear bank of the V-shape engine while inclining downward, and then extend to the position near the pivot of the rear wheel swing arm with less inclination, the upper frame can be extended substantially linearly in the fore-and-aft direction. Therefore, rigidity of the upper frame can further be increased, and consequently, rigidity of the vehicle body frame can further be increased.

In this manner, the front portion of the upper frame contributes to stabilize the air intake structure, and the rear portion of the upper frame can serve to receive the load from the rear wheel effectively. Therefore, rigidity of the vehicle body frame may be maintained effectively by a compact and lightweight structure.

DETAILED DESCRIPTION OF THE INVENTION

Figure 1:
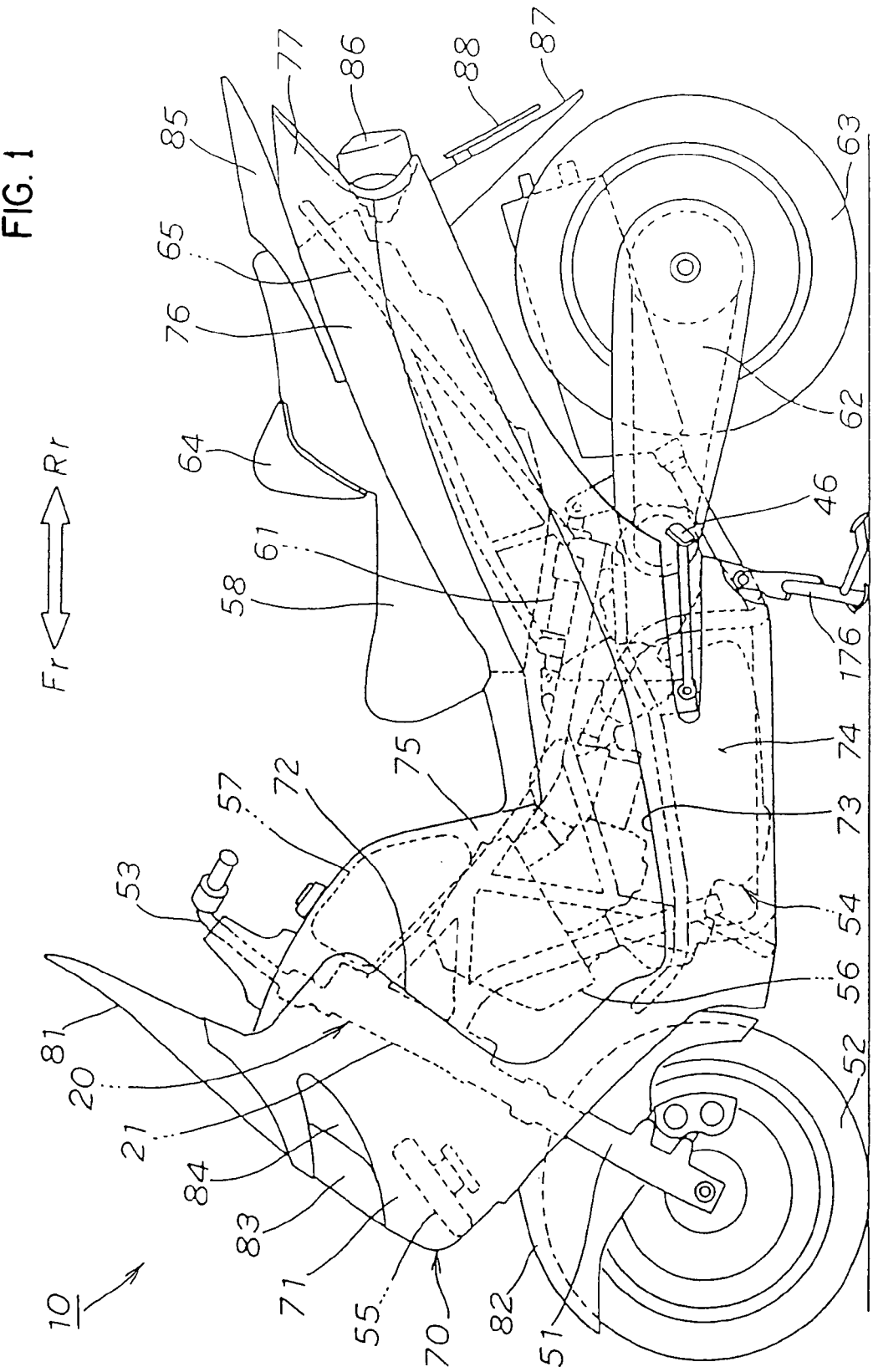
FIG. 1 is a left side view of a low-deck vehicle according to the present invention (first view).

Referring now to the attached drawings, embodiments of the present invention will be described. Terms "front", "rear", "left", "right", "up" and "down" represent directions viewed from a driver, and Fr designates the front, Rr represents the rear, L represent the left side, R represents the right side, and CL represents the center of the width of the vehicle (center of the vehicle body). The drawings are to be viewed in the direction in which the reference numerals are oriented in the right way.

Figure 2:
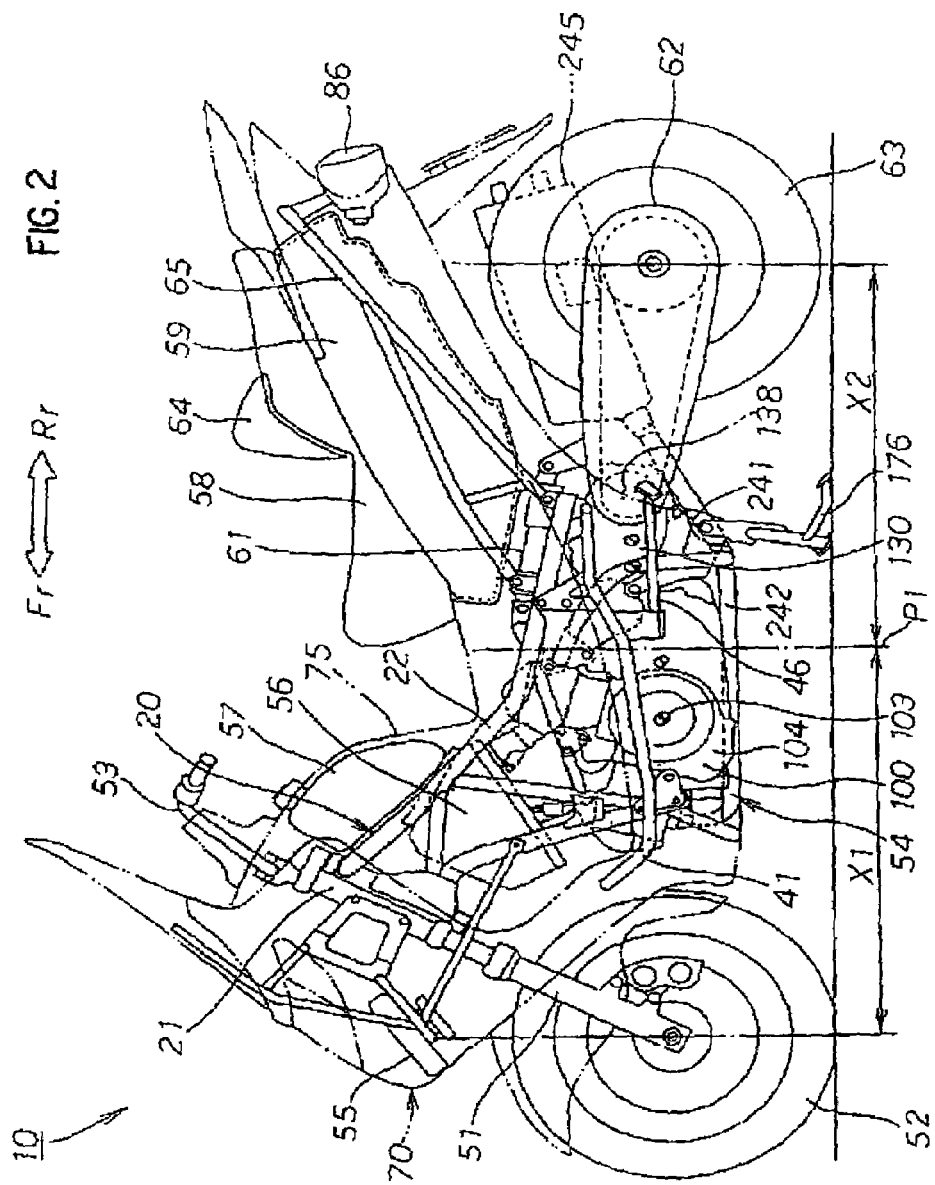
FIG. 2 is a left side view of the low-deck vehicle according to the present invention (second view).
Figure 3:
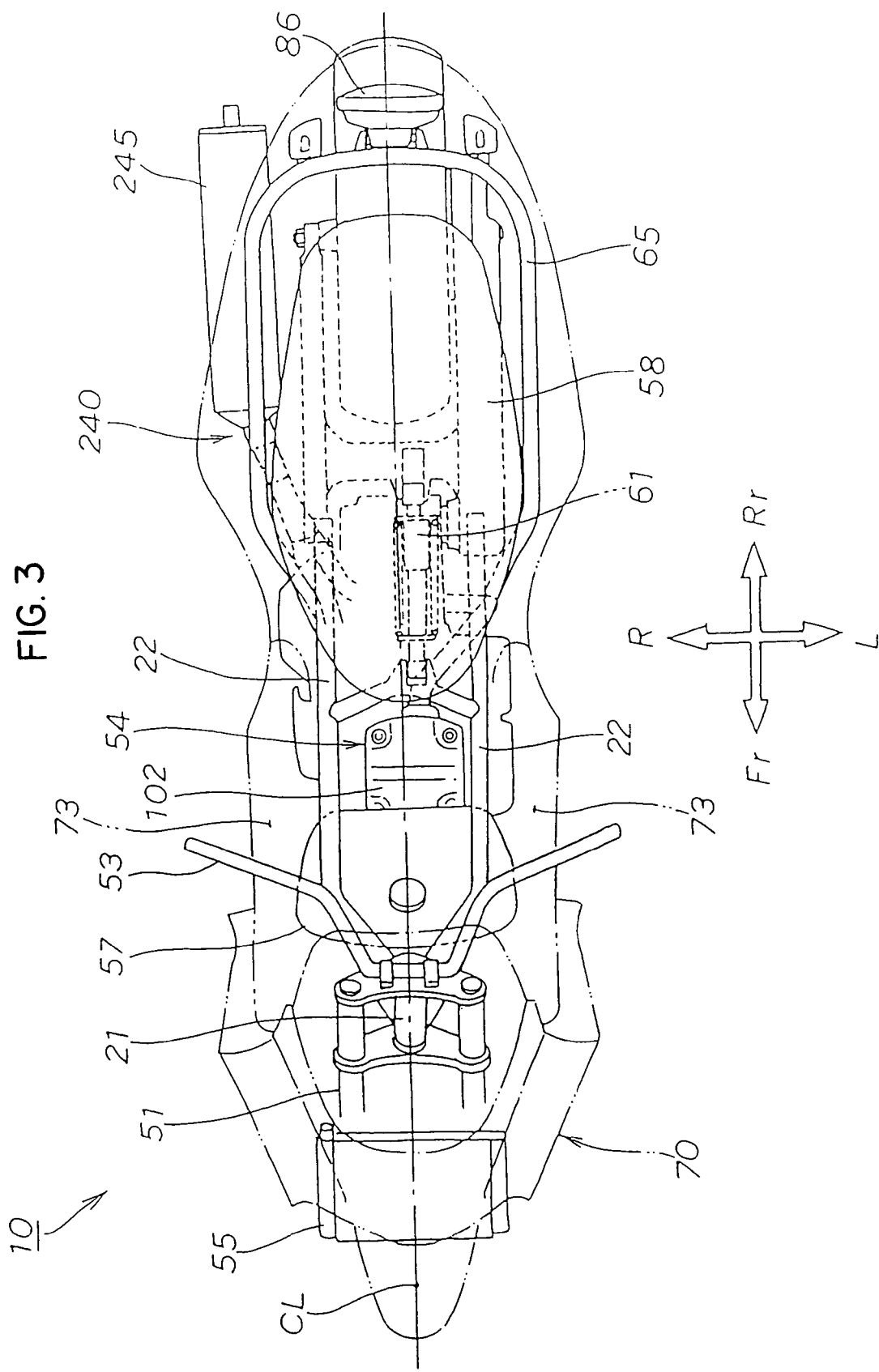
FIG. 3 is a plan view of the low-deck vehicle according to the present invention.

The general construction of the low-deck vehicle 10 will be described. FIG. 1 is a left side view of a low-deck vehicle according to the present invention (first view), showing a state in which a vehicle body cover is mounted. FIG. 2 is a left side view of the low-deck vehicle according to the present invention (second view), showing a state in which the vehicle body cover is removed. FIG. 3 is a plan view of the low-deck vehicle according to the present invention, in a state in which the vehicle body cover is removed.

The low-deck vehicle 10 mainly includes a vehicle body frame 20, a front fork 51 attached to a head pipe 21 of the vehicle body frame 20, a front wheel 52 attached to the front fork 51, a handle 53 connected to the front fork 51, a power unit 54 mounted to the lower portion of he vehicle body frame 20, a radiator 55 mounted at the upper front of the vehicle body frame 20, an air cleaner 56 and a fuel tank 57, a seat 58 mounted on the upper rear of the vehicle body frame 20, a storage box 59 mounted under the seat 58 at the rear of the vehicle body frame 20, a swing arm 62 suspended at the rear of the vehicle body frame 20 by a rear cushion 61 for a rear wheel, a rear wheel 63 mounted to the swing arm 62, and is a full cowling type vehicle, in which the vehicle body is entirely covered by a vehicle body cover (cowl) 70.

More specifically, the seat 58 is a tandem seat which allows two persons to sit fore and aft thereon, and is provided with a movable (adjustable) seat back 64 for a driver at the center thereof. Such seat 58 may be mounted to the vehicle body frame 20 by a seat rail 65 extending rearward from the upper rear portion of the vehicle body frame 20.

P1 is a mid point of the wheel base (distance between the centers of the front wheel 52 and the rear wheel 63), and the distance X1 is equal to the distance X2.

The vehicle body cover 70 includes a front cover 71 for covering the front portion of the head pipe 21 and the upper portion of the front wheel 52, an inner cover 72 for covering the rear portion of the front cover 71, a left and a right low-decks 73 (only the left one is shown, hereinafter) as step floor on which the driver's legs are placed, a left and a right floor skirts 74 extending downward from the outer edge of the low-decks 73, a center cover 75 extending rearward from the inner cover 72 and covering the longitudinal center of the vehicle body frame 20, a side cover 76 extending rearward from the center cover 75 and covering the rear portion of the vehicle body frame 20, the seat rail 65, and the storage box 59, and a rear cover 77 disposed rearwardly of the side cover 76 for covering the upper rear portion of the vehicle body.

The center cover 75 is a member for covering also the air cleaner 56, the fuel tank 57 and an engine 100.

In the drawing, reference numeral 81 designates a wind screen, numeral 82 designates a front fender, numeral 83 designates a head lamp, numeral 84 designates a winker, numeral 85 designates a rear spoiler and a grip, numeral 86 designates a tail lamp, numeral 87 designates a rear fender, and numeral 88 designates a number plate.

Figure 4:
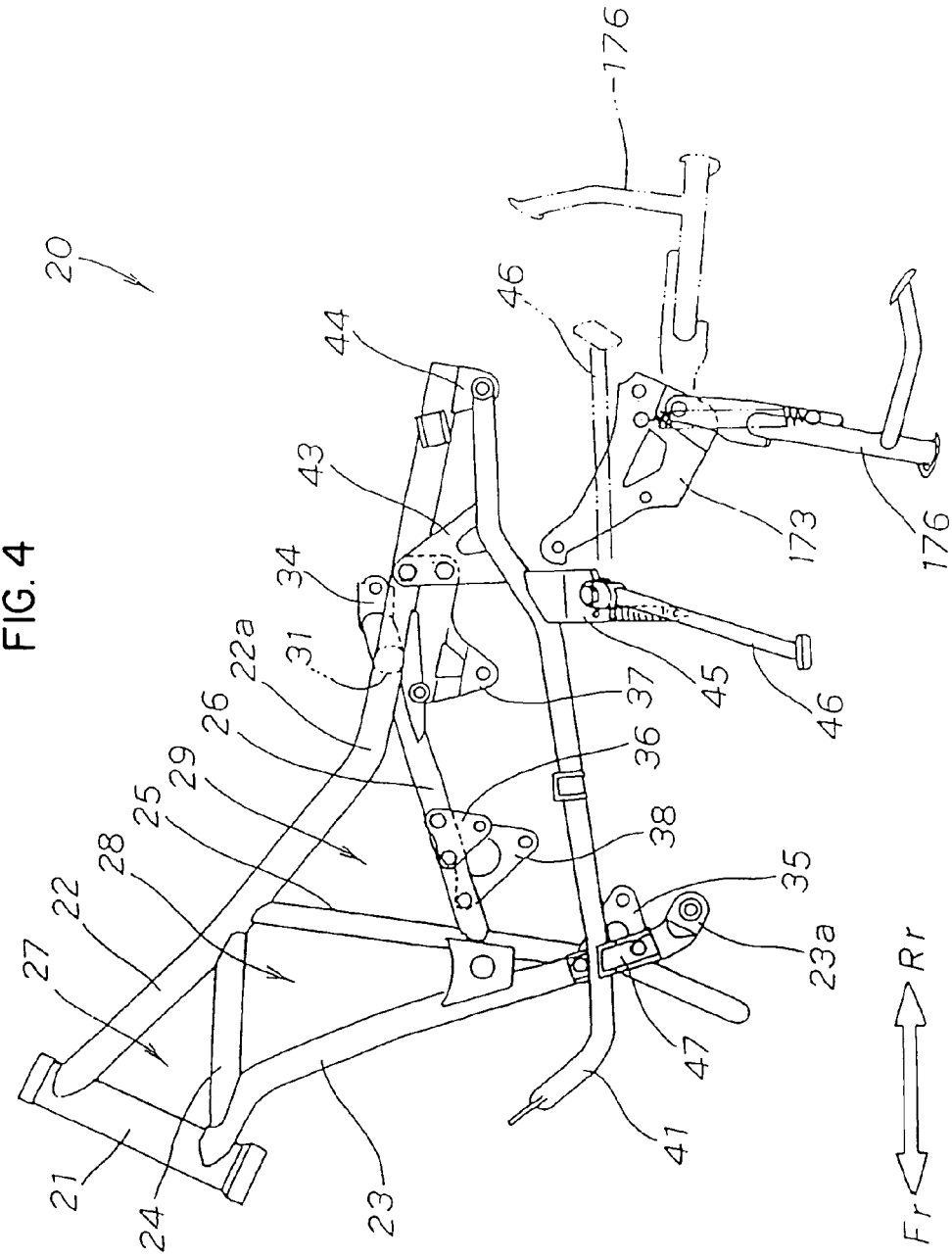
FIG. 4 is a left side view of a vehicle body frame according to the present invention.
Figure 5:
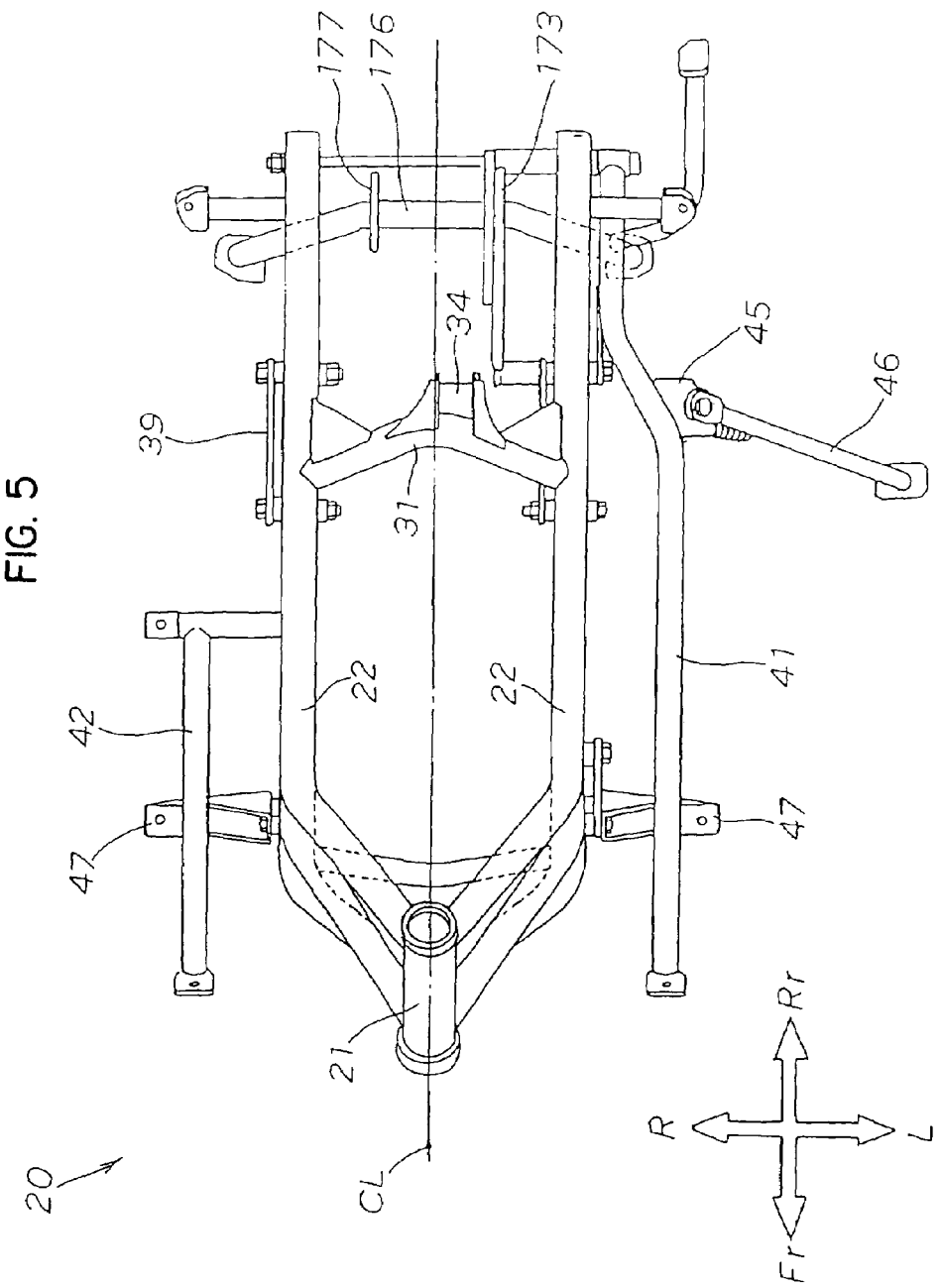
FIG. 5 is a plan view of the vehicle body frame according to the present invention.
Figure 6:
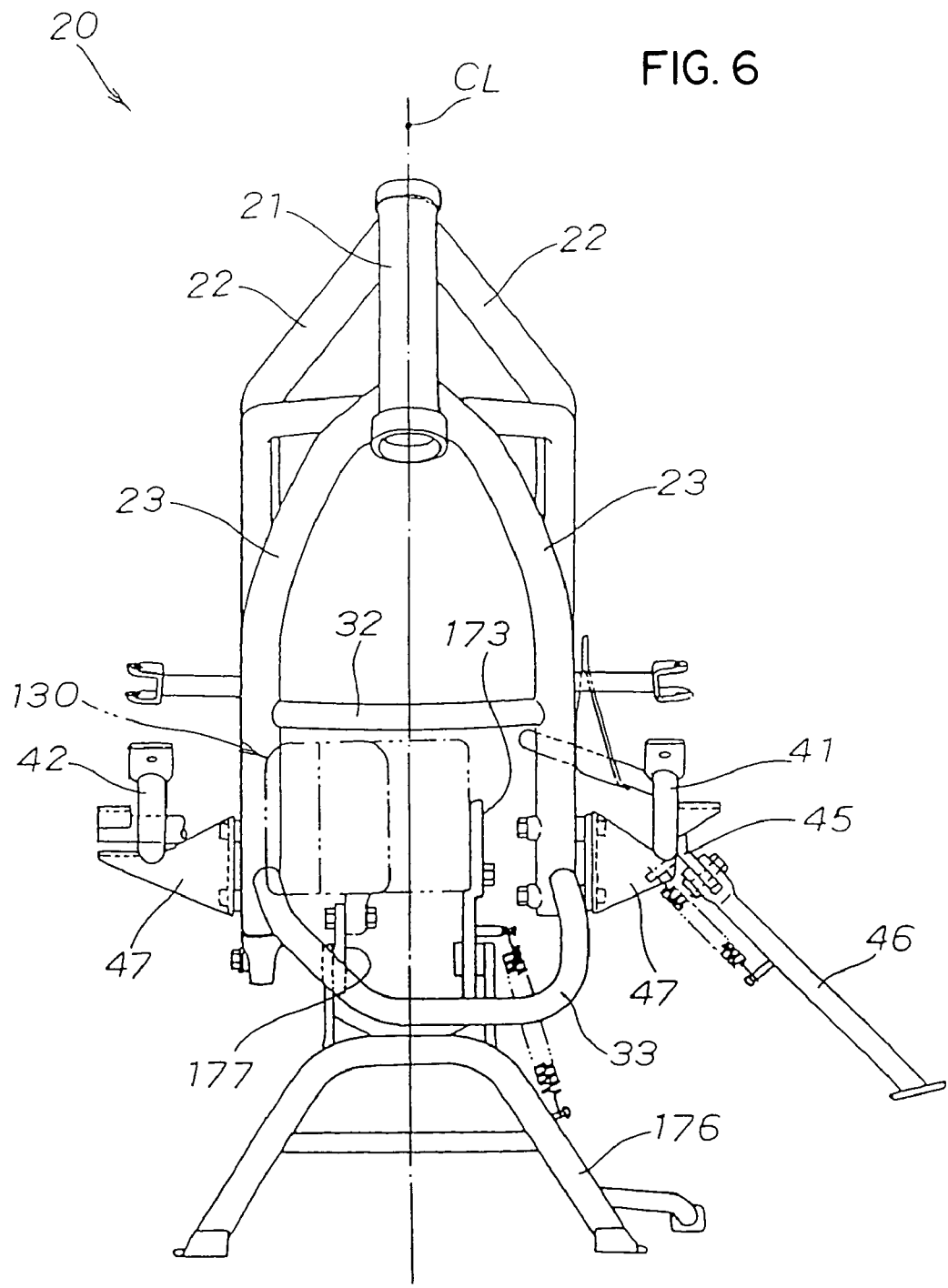
FIG. 6 is a front view of the vehicle body frame according to the present invention.
Figure 7:
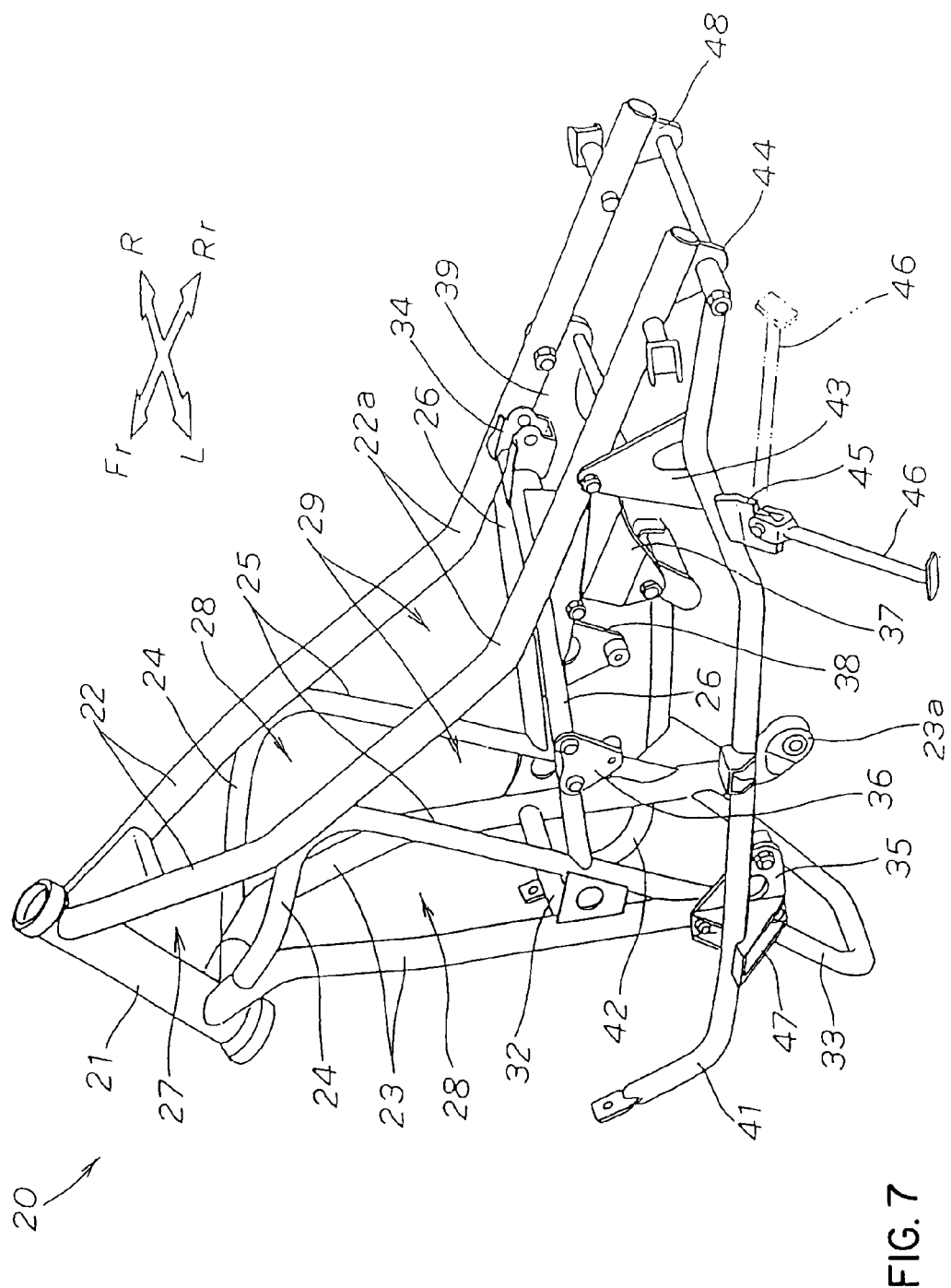
FIG. 7 is a perspective view of the vehicle body frame according to the present invention when viewed from the left side.
Figure 8:
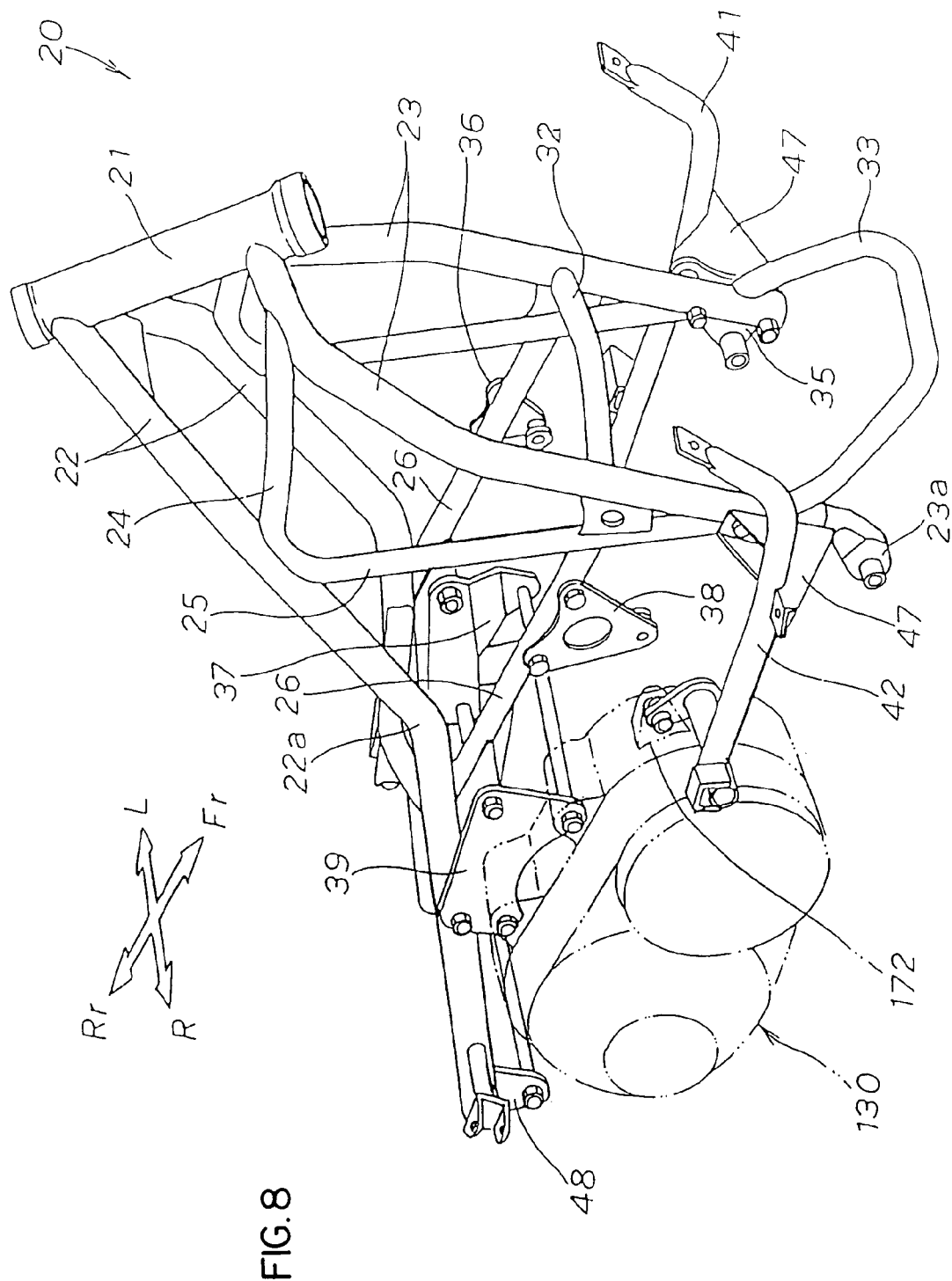
FIG. 8 is a perspective view of the vehicle body fame according to the present invention when viewed from the right side.

Subsequently, the vehicle body frame 20 will be described. FIG. 4 is a left side view of the vehicle body frame according to the present invention, FIG. 5 is a plan view of the vehicle body frame according to the present invention, FIG. 6 is a front view of the vehicle body frame according to the present invention, FIG. 7 is a perspective view of the vehicle body frame according to the present invention when viewed from the left side, and FIG. 8 is a perspective view of the vehicle body fame according to the present invention when viewed from the right side.

The vehicle body frame 20 includes a pair of left and right upper frames 22, 22 extending rearward and downward from the head pipe 21, a pair of left and right down frames 23, 23 extending downward from the head pipe 21 and connected to the front portion of a crankcase 104 of the V-shape engine 100 (See FIG. 2), and is a diamond-shaped frame for suspending the V-shape engine 100.

More specifically, the upper frames 22, 22 are pipe members extending substantially linearly rearward from the upper portion of the head pipe 21 while inclining downward, and then extending further rearward and downward from lower ends 22a with less inclination. The down frames 23, 23 are pipe members extending rearward and downward from the lower portion of the head pipe 21 at an inclination angle larger than that of the upper frames 22, 22.

Between the left upper frame 22 and the left down frame 23, and between the right upper frame 22 and the right down frame 23 are of a trussed frame structure (triangle framework structure).

More specifically, the trussed frame structure includes three spaces 27 to 29 of triangle in side view formed by a substantially horizontal first reinforcing member 24 extending from the joint portion between the head pipe 21 and the down frame 23 toward the upper frame 22, a second reinforcing member 25 extending from the joint portion between the upper frame 22 and the first reinforcing member 24 toward the lower end of the down frame 23 and joining thereto, and a third reinforcing member 26 laying across the portion of the upper frame 22 in the vicinity of the lower end 22a and the midsection of the second reinforcing member 25. These spaces 27 to 29 pass laterally through the vehicle.

In other words, the first space 27 is a space formed by the head pipe 21, the upper frame 22 and the first reinforcing member 24. The second space 28 is a space formed by the down frame 23, and the first and the second reinforcing members 24, 25. The third space 29 is a space formed by the upper frame 22 and the second and the third reinforcing members 25, 26.

The rigidity of the vehicle body frame 20 is secured by laying a cross member 31 between the left and the right upper frames 22, 22 in the vicinity of the lower end 22a of the upper frame 22 and laying two cross members 32, 33 between the midsections of the left and the right down frames 23, 23 and between the lower ends of the same. The cross member 31 between the left and the right upper frames 22, 22 is provided with a cushion bracket 34.

The vehicle body frame 20 includes a left first hanger plate 35 at the lower end of the left down frame 23, a left second hanger plate 36 on the left third reinforcing member 26, a left third hanger plate 37 in the vicinity of the joint portion between the left upper frame 22 and the left third reinforcing member 26, a left fourth hanger plate 44 at the rear end of the left upper frame 22, and as shown in FIG. 8, includes a right hanger portion 23a at the lower end of the right down frame 23, a right first hanger plate 38 at the right third reinforcing member 26, a right second hanger plate 39 in the vicinity of the joint portion between the right upper frame 22 and the right third reinforcing member 26, and a right third hanger plate 48 at the rear end of the right upper frame 22.

The hanger plates 35–39, 44, 48 are connecting members that are removable from the vehicle body frame 20.

The present invention is characterized in that the low-deck 73 (See FIG. 1) is supported by a left and a right low-deck supporting frames 41, 42 fixed to the lower portions of the down frames 23, 23 via stays 47, 47 and extending in the fore-and-aft direction.

The left low-deck supporting frame 41 is a pipe member the rear portion of which is connected to the rear portion of the left upper frame 22 by a stay 43 and the left fourth hanger plate 44, and is integrally provided with a side stand 46 at the rear portion thereof. The left fourth hanger plate 44 also serves as stay for the low-deck supporting frame.

More specifically, the side stand 46 is attached to the left low-deck supporting frame 41 by a bracket 45 so as to be capable of standing and being retracted. As shown in FIG. 8, the right low-deck supporting frame 42 is connected to a bracket 172 of a transmission unit 130 shown by phantom lines at the rear portion thereof.

The mounting structure of the low-deck supporting frames 41, 42 will be described collectively below.

The low-deck supporting frames 41, 42 extending in the fore-and-aft direction are fixed to the lower portions of the down frames 23, 23 of the diamond-shaped frame, and the low-deck 73 (See FIG. 1) is supported by the low-deck supporting frames 41, 42. Therefore, although the V-shape engine 100 (See FIG. 2) is adapted to be suspended, the low-deck 73 can be supported reliably and stably, that is, effectively.

In addition, the rear portion of the left low-deck supporting frame 41, which is fixed to the lower portion of the left down frame 23, is also connected to the rear portion of the left upper frame 22. Therefore, the left low-deck supporting frame 41 elongated in the fore-and-aft direction can be fixedly secured by the vehicle body frame 20. Consequently, rigidity of the low-deck supporting frame 41 can be improved, the low-deck 73 can be supported reliably and stably, and the supporting rigidity may further be improved.

On the other hand, as shown in FIG. 8, the rear portion of the right low-deck supporting frame 42 fixed to the lower portion of the right down frame 23 is further connected to the transmission unit 130, which is high in rigidity. Therefore, the right low-deck supporting frame 42, which is elongated in the fore-and-aft direction, can be fixedly secured by the vehicle body frame 20 or the transmission unit 130. Accordingly, the rigidity of the low-deck supporting frame 42 can be enhanced, and the low-deck 73 can be supported further reliably and stably, whereby the supporting rigidity may further be improved.

In addition, as shown in FIG. 4, since the side stand 46 is integrally held by the rear portion of the left low-deck supporting frame 41, the low-deck supporting frame 41 can also serve to hold the side stand 46. Therefore, shared use with other functional components is achieved, the bracket 45 for holding the side stand 46 may be downsized, and no separate holding part is necessary. In addition, since the side stand 46 is held by the low-deck supporting frame 41 extending in the fore-and-aft direction, the side stand 46 can be mounted to an arbitrary position in the fore-and-aft direction, whereby flexibility in designing is increased.

Figure 9:
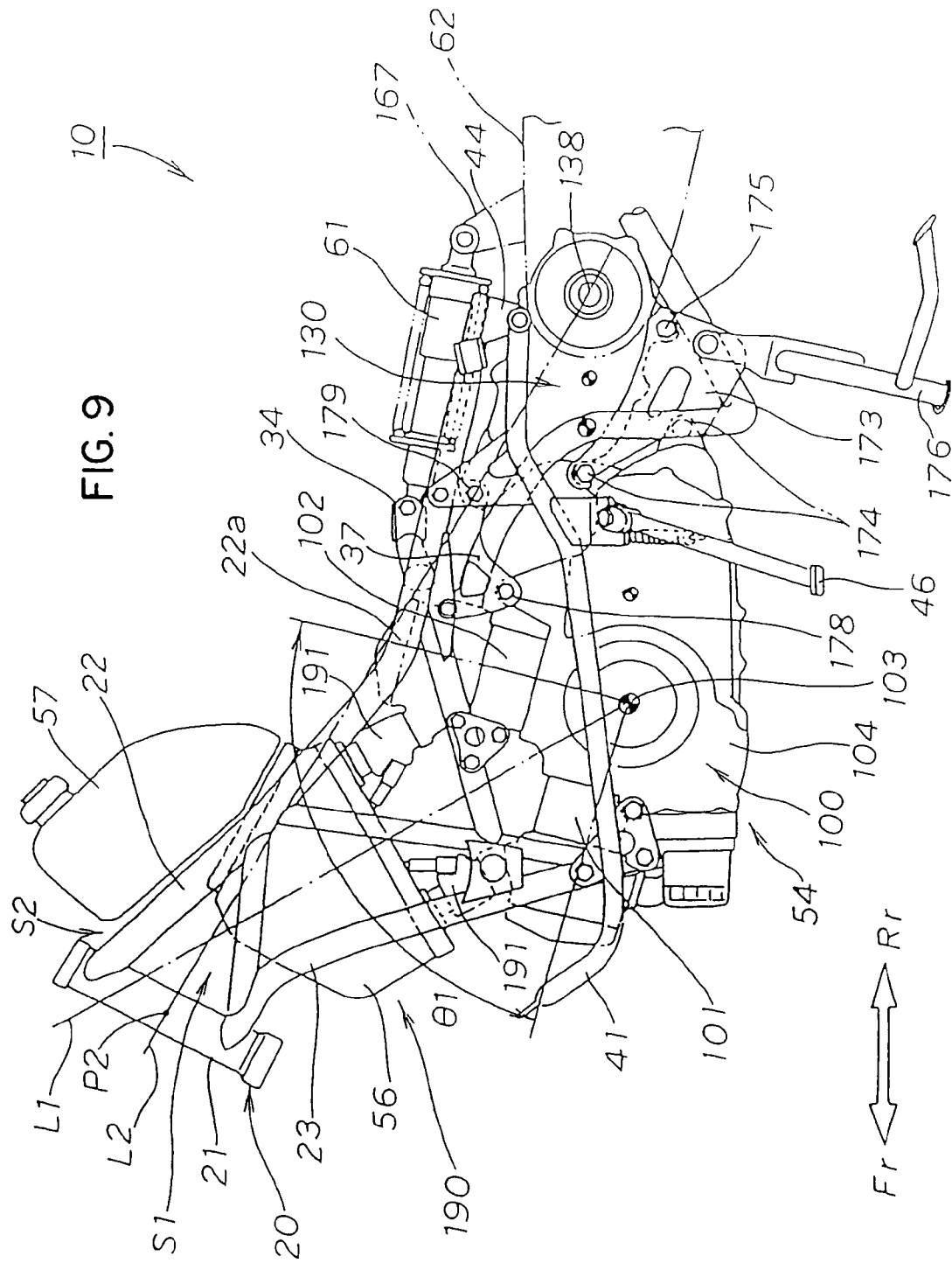
FIG. 9 is a left side view around the vehicle body frame, a power unit, an air cleaner, and a fuel tank according to the present invention.
Figure 10:
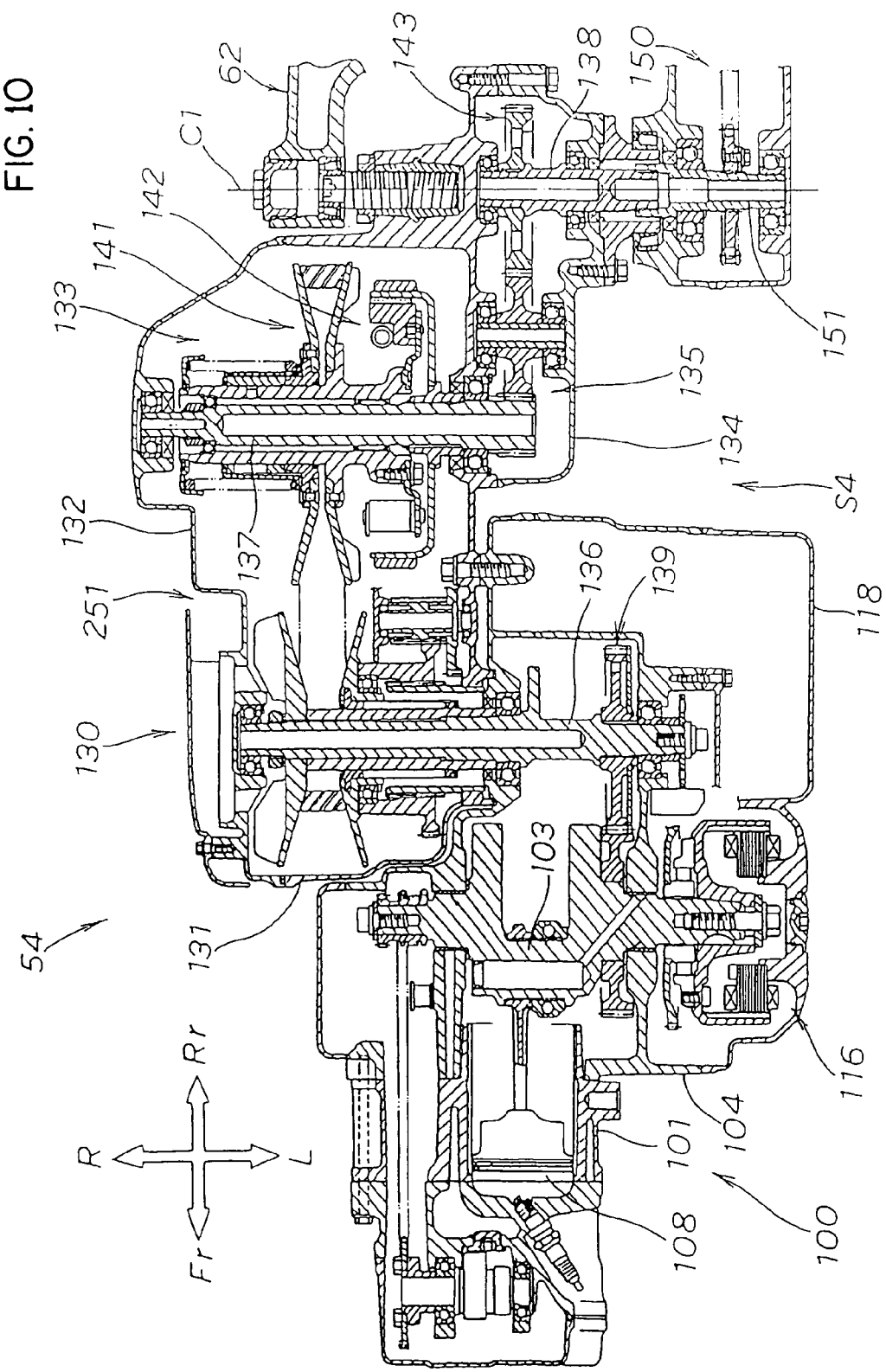
FIG. 10 is a cross-sectional view of the power unit according to the present invention.
Figure 11:
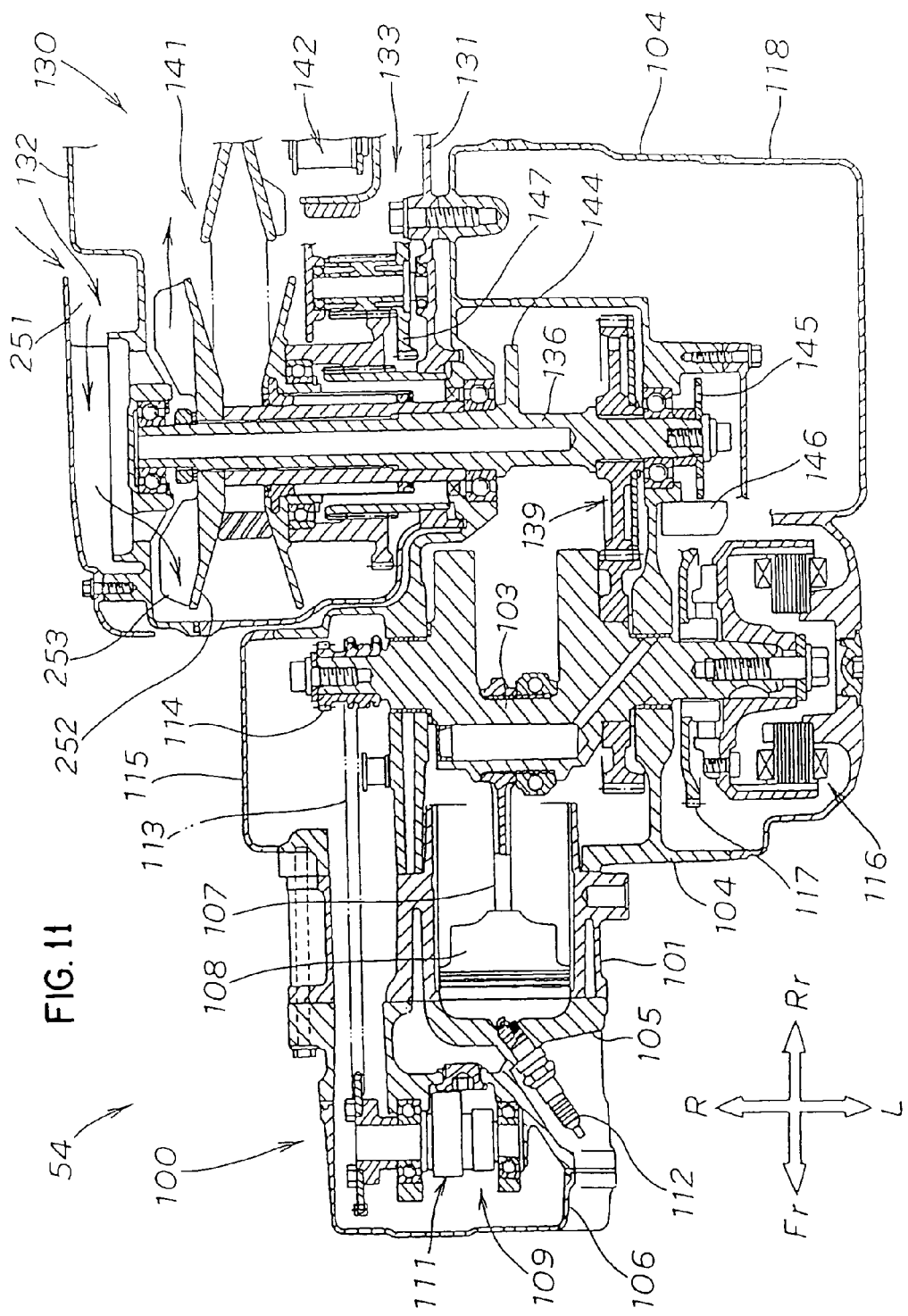
FIG. 11 is a cross-sectional view of the front half of the power unit according to the present invention.
Figure 12:
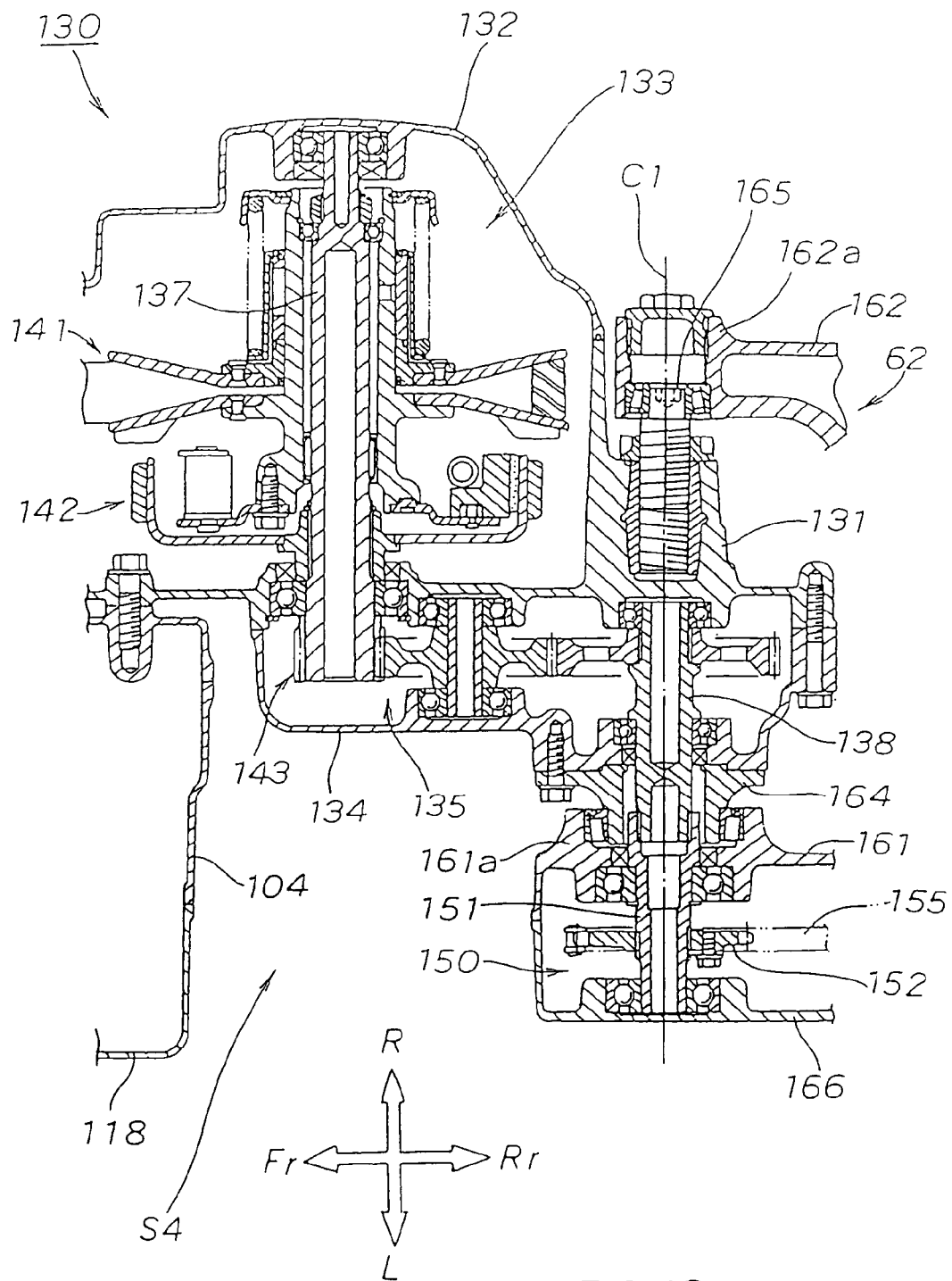
FIG. 12 is a cross-sectional view of the rear half of the power unit according to the present invention.
Figure 13:
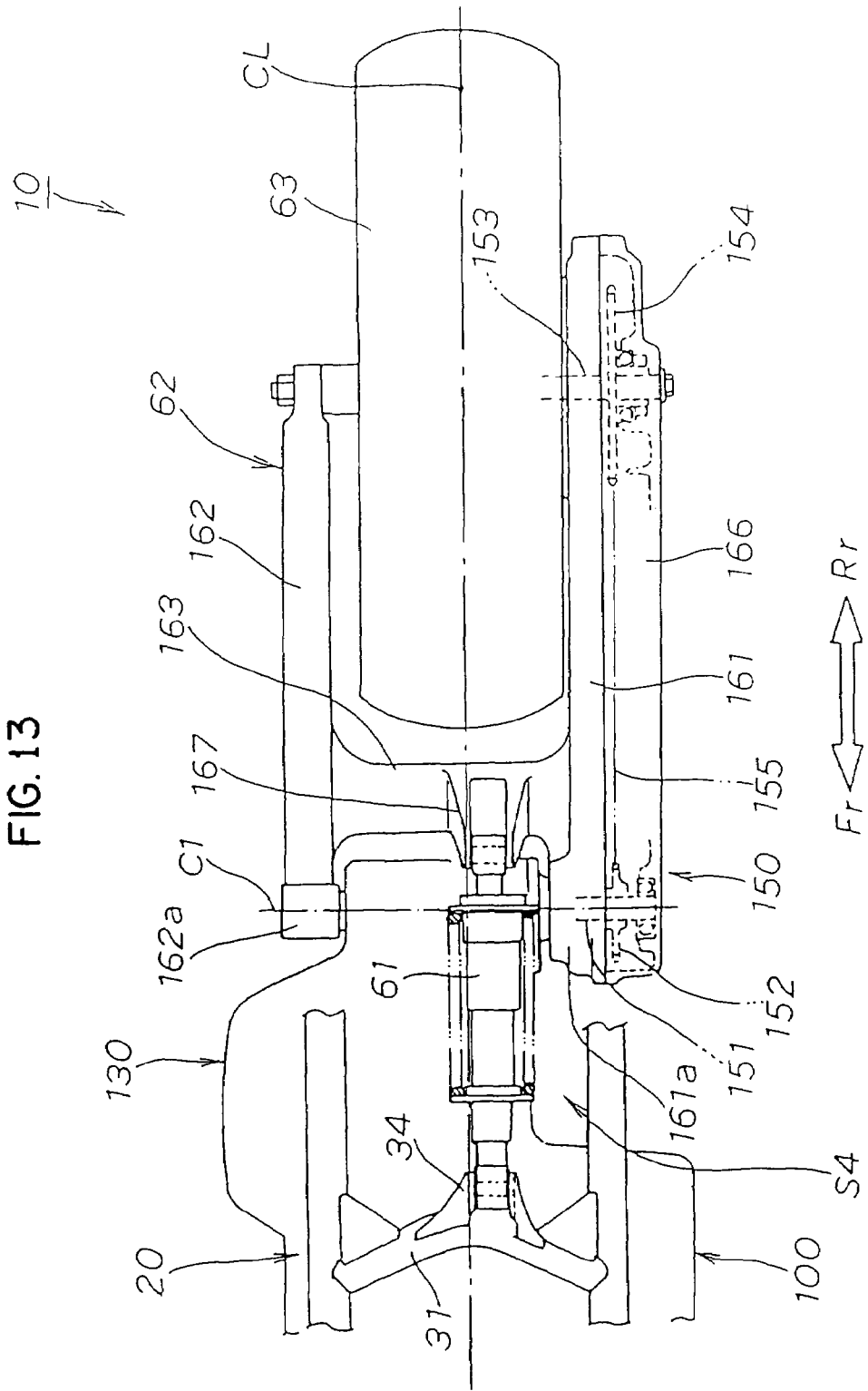
FIG. 13 is a plan view around the rear portion of the power unit and a swing arm for a rear wheel according to the present invention.

Subsequently, the construction around the power unit 54 will be described. FIG. 9 is a left side view around the vehicle body frame, the power unit, the air cleaner, and the fuel tank according to the present invention. FIG. 10 is a cross-sectional view of the power unit according to the present invention showing a cross-sectional structure of the power unit 54 viewed from above. FIG. 11 is a cross-sectional view of the front half of the power unit according to the present invention, which corresponds to FIG. 10. FIG. 12 is a cross-sectional view of the rear half of the power unit according to the present invention, which corresponds to FIG. 10. FIG. 13 is a plan view around the rear portion of the power unit and the swing arm for a rear wheel according to the present invention.

The power unit 54 is a combination of the engine 100 shaped like a letter V in the fore-and-aft direction at the front and the transmission unit 130 at the rear. In other words, the power unit 54 includes the transmission unit 130.

As shown in FIG. 9, the V-shape engine 100 is a two-cylinder engine in which the bank angle θ1 (an angle θ1 formed between cylinders 101, 102) is set to a value about 90° or an angle larger than 90° in side view. In V-shape engine 100, the cylinder 101 of the front bank, which is the front cylinder 101, extends substantially horizontally toward the front so as to be oriented toward the point above an axle of the front wheel 52 (See FIG. 2). The cylinder 102 of the rear bank, that is, the rear cylinder 102 extends upward substantially vertically so as to be oriented toward the lower end 22a of the upper frame 22. The present invention is characterized in that the V-shape engine 100 is disposed with the bisector L1 of the bank angle θ1 oriented toward the head pipe 21.

FIG. 9 shows that the cylinder 101 of the front bank is disposed forwardly of the left and the right down frames 23, 23 by disposing a crankshaft 103 of the V-shape engine 100 forwardly of the midpoint P1 of the wheelbase (See FIG. 2), and that the cylinder 102 of the rear bank is disposed between the left and the right upper frames 22, 22 (See also FIG. 3).

The V-shaped engine 100 may be disposed as forwardly as possible by disposing the cylinder 101 of the front bank forwardly of the right and the left down frames 23, 23. As a consequence, since the center of gravity of the low-deck vehicle 10 can be set to the front, and thus the load exerted to the front wheel 52 and the rear wheel 63 (See FIG. 2) can be distributed further suitably.

Furthermore, the position of the crankshaft 103 of the V-shape engine 100 is shifted to the front by disposing the cylinder 101 of the front bank to the front. In this case as well, the bisector L1 of the bank angle θ1 is oriented toward the head pipe 21. Since the position of the crankshaft 103 is shifted to the front, the bisector L1 of the bank angle θ1 is shifted toward the upright position correspondingly, and thus the cylinder 102 of the rear bank is inclined rearwardly of the vehicle body. Therefore, the height of the cylinder 102 of the rear bank may be lowered. Therefore, flexibility in mounting of the V-shape engine 100 is increased.

In addition, since the cylinder 102 of the rear bank is disposed between the left and the right upper frames 22, 22, even when the upper frames 22, 22 are lowered, they do not interfere with the cylinder 102 of the rear bank. Therefore, the upper frames 22, 22 can be disposed as low as possible. Consequently, since the center of gravity of the vehicle body frame 20 is lowered, the center of gravity of the low-deck vehicle 10 can be lowered, and thus reduction of vibrations is also enabled. In addition, since the center of gravity may be set to the position lower than the low-deck 73 (See FIG. 1), the operation of the low-deck vehicle 10 is facilitated. Furthermore, by lowering the upper frames 22, 22, the driver can easily straddle the vehicle body frame 20 when riding on the vehicle.

In order to enable the V-shape engine 100 to be disposed at the front, the radiator 55 of the engine (water-cooled engine) 100 is disposed forwardly of the head pipe 21 as shown in FIG. 2. By moving the radiator 55 disposed in front of the water-cooled engine in the related art to the position forwardly of the head pipe 21, the V-shape engine 100 can be disposed as forwardly as possible.

The V-shape engine 100 and the transmission unit 130 are disposed with the lower halves positioned downwardly of the low-deck supporting frames 41, 42 (only the left one is shown in the drawing). Therefore, the V-shape engine 100 and the transmission unit 130 may be mounted to the low-deck vehicle 10 so as to be disposed downwardly of the low-deck 73 (See FIG. 1) which is supported by the low-deck supporting frames 41, 42 from below. The crankshaft 103 is disposed downwardly of the low-deck 73 and the low-deck supporting frames 41, 42.

In this arrangement, the V-shape engine 100 and an air intake structure 190 are disposed in a space S1 downwardly of the straight line L2 passing through the center point P2 of the height of the head pipe 21 and a final output shaft 138 of the transmission unit 130. In addition, the bisector L1 of the bank angle θ1 can be oriented toward the head pipe 21.

The air intake structure 190 stated here is a system for supplying air for combustion to the V-shape engine 100, and includes the air cleaner 56 and air intake connecting hoses 191, 191 to be connected from the air cleaner 56 to the respective cylinders 101, 102.

Since the V-shape engine 100 is disposed with the bisector L1 of the bank angle θ1 oriented toward the head pipe 21, the bank angle θ1 can be set to a wide angle wider than about 90°. Setting the bank angle θ1 to a large angle is advantageous for vibrations of the V-shape engine 100, and a large space for disposing the air intake structure 190 including the air intake connecting hoses 191, 191 for the respective cylinders 101, 102 and the air cleaner 56 is secured. Therefore, flexibility in designing of the air intake structure 190 is increased.

In addition, since the bisector L1 of the bank angle θ1 is oriented toward the head pipe 21, a large space can be secured between the V-shaped banks and the head pipe 21. Since the air intake structure 190 including the air intake connecting hoses 191, 191 and the air cleaner 56 is disposed in such large space between the V-shaped banks so as to be oriented toward the head pipe 21, the air intake structure 190 and the V-shape engine 100 can be connected effectively, and thus the performance of the V-shape engine 100 can be improved. In addition, the air intake structure 190 can be downsized and placed collectively at the relatively low level. Therefore, the fuel tank 57 can easily be disposed above the low air intake structure 190 so that the mass can be concentrated to the front portion.

Since the center of gravity of the low-deck vehicle 10 can be set to the front by disposing the fuel tank 57 at the front of the low-deck vehicle 10, the load exerted to the front wheel 52 and the rear wheel 63 can be distributed further suitably. In addition, since it is not necessary to dispose the fuel tank 57 downwardly of the seat 58 (See FIG. 2), a large space may be secured under the seat 58. Therefore, considerable effects such as being capable of disposing the storage box 59 (See FIG. 2) having the large storing space, are achieved.

In addition, since the V-shape engine 100 and the air intake structure 190 are disposed in the space S1 downwardly of the straight line L2 passing through the head pipe 21 and the final output shaft 138 of the transmission unit 130, a space S2 above the air cleaner 56 can be used effectively. Therefore, the fuel tank 57 as functional component may easily be disposed upwardly of the air cleaner 56.

The extremity of the cylinder 102 of the rear bank and the upper end of the air cleaner 56 of the air intake structure 190 are projecting slightly upward from the straight line L2, it is within the range corresponding substantially to the upper outline of the upper frames 22, 22, and, can be regarded substantially as being disposed in the space S1 under the straight line L2 passing through the head pipe 21 and the final output shaft 138.

FIG. 10 to FIG. 12 are cross-sectional view showing the construction of the power unit 54. The V-shape engine 100 is illustrated with the cylinder 102 of the rear bank omitted.

The V-shape engine 100 includes the crankcase 104 that can be divided into left and right halves, the cylinder 101 of the front bank and the cylinder 102 of the rear bank connected to the crankcase 104 (See FIG. 9), a head 105 connected to the extremities of the cylinders 101, 102 and a head cover 106, the crankshaft 103 extending in the direction of the width of the vehicle and rotatably stored in the crankcase 104, a piston 108 connected to the crankshaft 103 by a connecting rod 107, a valve mechanism 111 stored in a cam chamber 109, and an ignition plug 112, and the like and is a water-cooled engine having a water-cooling jacket.

In the drawing, reference numeral 113 designates a cam chain, numeral 114 designates a drive gear for coolant pump, numeral 115 designates a right side cover, numeral 116 designates an AC generator, numeral 117 designates a crank shaft driving gear by a starter motor (described later).

By covering a left side cover 118 over the left side of the crankcase 104, the portion around the left end of the crankshaft 103, the AC generator 116, the left end of a first power transmitting shaft 136, which will be described later, is widely covered.

The transmission unit 130 is connected to the engine 100 on one side (right side R) of the V-shape engine 100, and extends rearward on one side (right side R) of the low-deck vehicle 10, so that the rear wheel 63 is driven from the other side (left side L) of the lower-deck vehicle 10 by a pivot portion of the rear wheel swing arm 62.

In this manner, the crankcase 104 and the transmission unit 130 are combined in a substantially angular C-shape in plan view to construct the power unit 54, and an opening of an angular C-shape in plan view is formed on the other side (left side L) of the low-deck vehicle 10.

In this arrangement, only the V-shape engine 100 or the transmission unit 130 may be modified, and thus the power unit 54 of high versatility is achieved.

More specifically, the transmission unit 130 includes a main case 131 mounted to the right surface of the rear portion of the crankcase 104 and extending rearward, a first cover 132 for closing the opening on the right side of the main case 131, a first transmission chamber 133 formed by the main case 131 and the first cover 132, a sub case 134 overlapped on the left side of the rear portion of the main case 131, a second transmission chamber 135 formed by the main case 131 and the sub case 134, the first power transmitting shaft 136 extending from the rear portion in the crankcase 104 toward the interior of the first transmitting chamber 133 laterally of the vehicle, a second power transmitting shaft 137 extending from the rear portion in the first transmission chamber 133 toward the interior of the second transmission chamber 135 laterally of the vehicle, the final output shaft 138 extending from the interior of the second transmission chamber 135 through the sub case 134 to the outward toward the left, a first gear mechanism 139 transmitting power from the left end of the crankshaft 103 to the left end of the first power transmitting shaft 136, a belt-type stepless transmission mechanism 141 for transmitting power from the right end of the first power transmitting shaft 136 to the right end of the second power transmitting shaft 137, a centrifugal clutch 142, and a second gear mechanism 143 for transmitting power from the left end of the second power transmitting shaft 137 to the final output shaft 138.

The belt-type stepless transmission mechanism 141 employs a motor control system, which controls gear change by a servomotor, not shown, via a speed change gear 147.

Reference numeral 144 designates a balancer, numeral 145 designates a reluctor, and numeral 146 designates a pulser (a angle sensor for a crankshaft), which is used for controlling ignition and fuel injection of the engine 100.

Referring to FIG. 13, the description will be continued. Power of the V-shape engine 100 can be transmitted to the rear wheel 63 from the transmission unit 130 by a chain drive mechanism 150 by spline-fitting a power transmitting shaft 151 to the left end of the final output shaft 138, mounting a drive sprocket 152 to the power transmitting shaft 151, mounting a driven sprocket 154 to an axle 153 for the rear wheel 63, and attaching a chain 155 around the drive sprocket 152 and the driven sprocket 154.

An axial center C1 of the final output shaft 138 corresponds to the center C1 of pivotal movement (center C1 of swinging movement) of the rear wheel swing arm 62.

The swing arm 62 is a member of substantially H-shape in plan view, including a left arm 161, a right arm 162, and a cross member 163 for connecting the left and the right arms 161, 162, and is capable of rotatably supporting the rear wheel 63 at its rear end.

Such swing arm 62 is disposed in such a manner that the right side surface of the rear portion of the main case 131 and the left side surface of the rear portion of the sub case 134 are sandwiched by the front ends of the left and the right arms 161, 162. The swing arm 62 may be mounted so as to be capable of swinging in the vertical direction by rotatably supporting a left supported portion 161a at the front end of the left arm 161 by a left pivot 164 at the left side of the rear portion of the sub case 134 and rotatably supporting the right supported portion 162a at the front end of the right arm 162 by a right pivot 165 at the right side of the rear portion of the main case 131.

The pivot 165 is a male screw to be screwed into the main case 131 so as to be capable of rising and setting. The right supported portion 162a can be mounted to the main case 131 by setting the pivot 165 into the main case 131 by being screwed in advance and, after the swing arm 62 is located to the pivot center C1, exposing the tip of the pivot 165 and being fitted to the right supported portion 162a.

The left arm 161 also serves as chain case, and the drive and the driven sprockets 152, 154 and the chain 155 may be stored therein by covering the opening on the left side of the left arm 161 with a chain cover 166.

As is clear from the description above, the power unit 54 may be provided with the opening of angular C-shape in plan view enclosed by the rear end portion of the crankcase 104, left side portion of the main and the sub cases 131, 134 of the transmission unit 130, and the front end portion of the left arm 161 of the swing arm 62 on the other side portion (left side L) of the low-deck vehicle 10.

Figure 14:
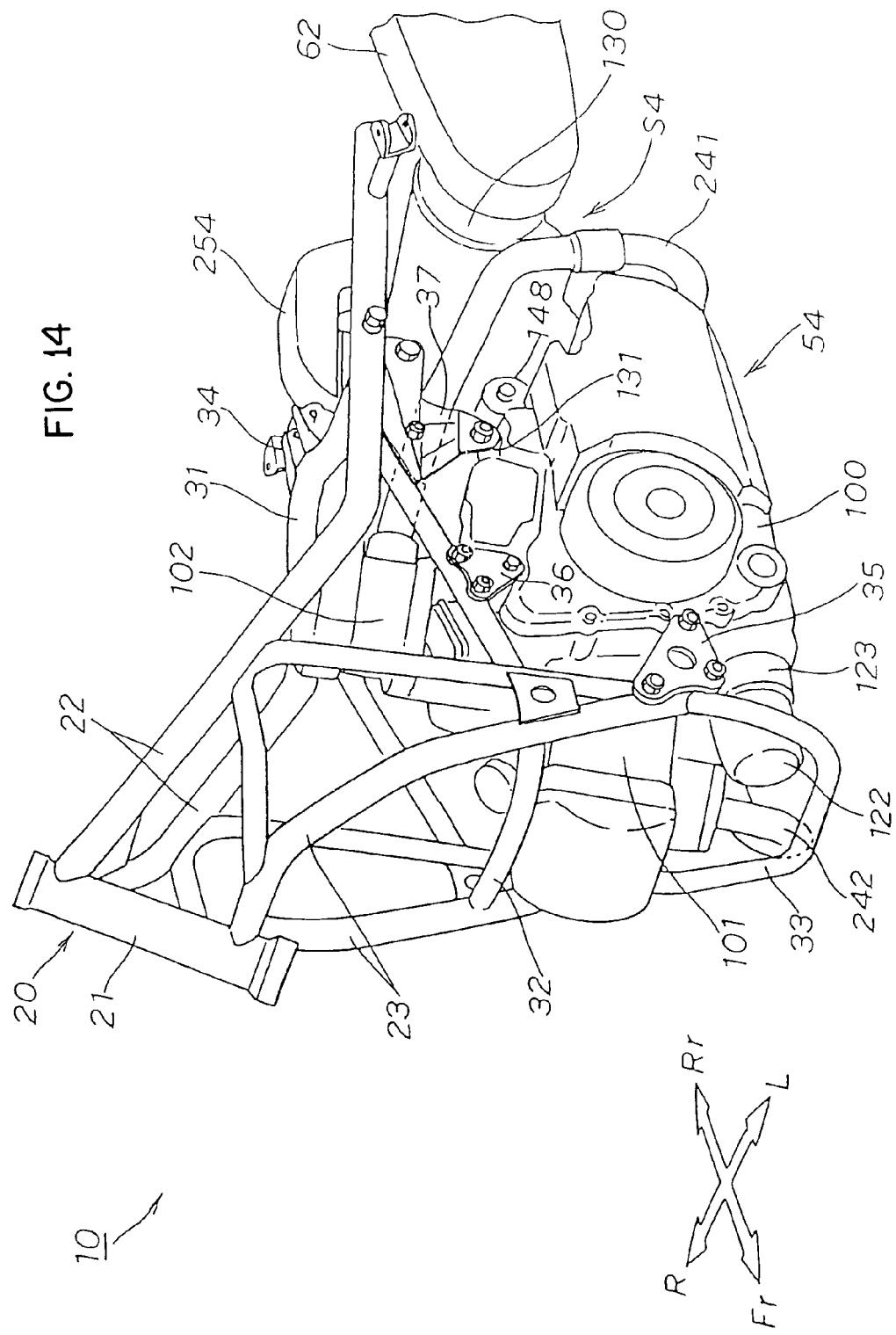
FIG. 14 is a perspective view of the portion around the vehicle body frame and the power unit according to the present invention when viewed from the front on the left side.
Figure 15:
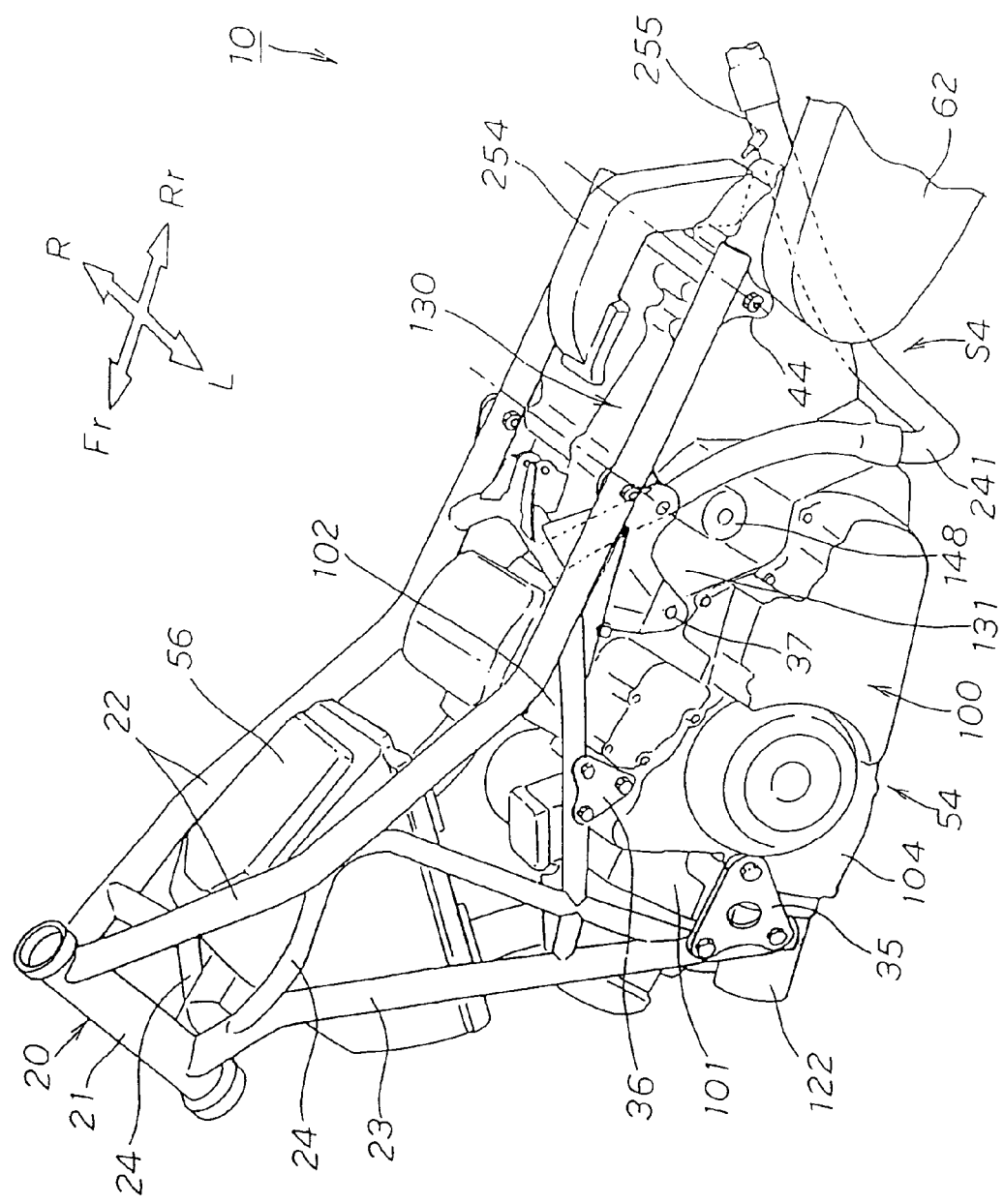
FIG. 15 is a perspective view of the portion around the vehicle body frame, the power unit, and the air cleaner according to the present invention when viewed from behind on the left side.
Figure 16:
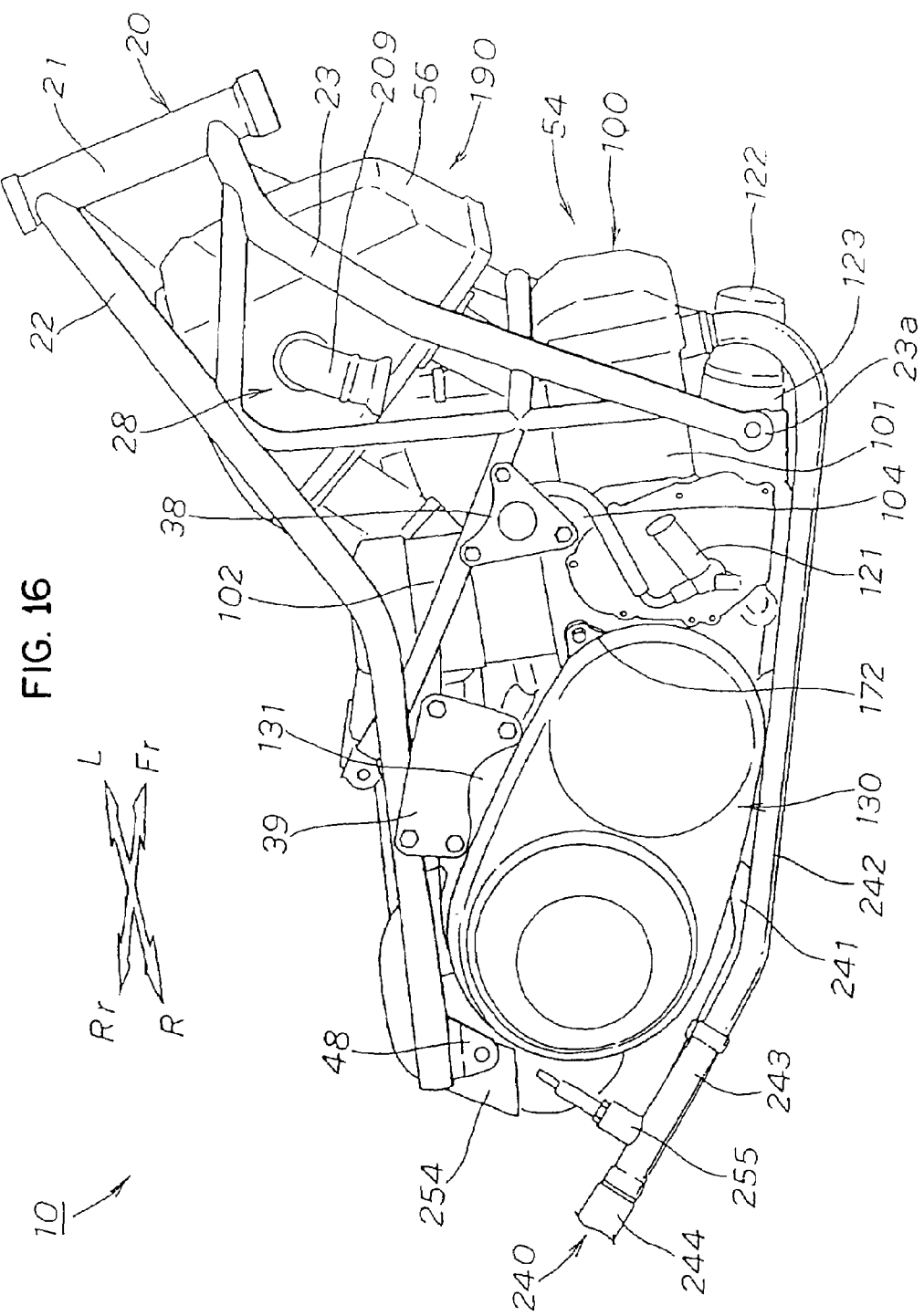
FIG. 16 is a perspective view of the portion around the vehicle body frame, the power unit, and the air cleaner according to the present invention when viewed from the front on the right side.
Figure 17:
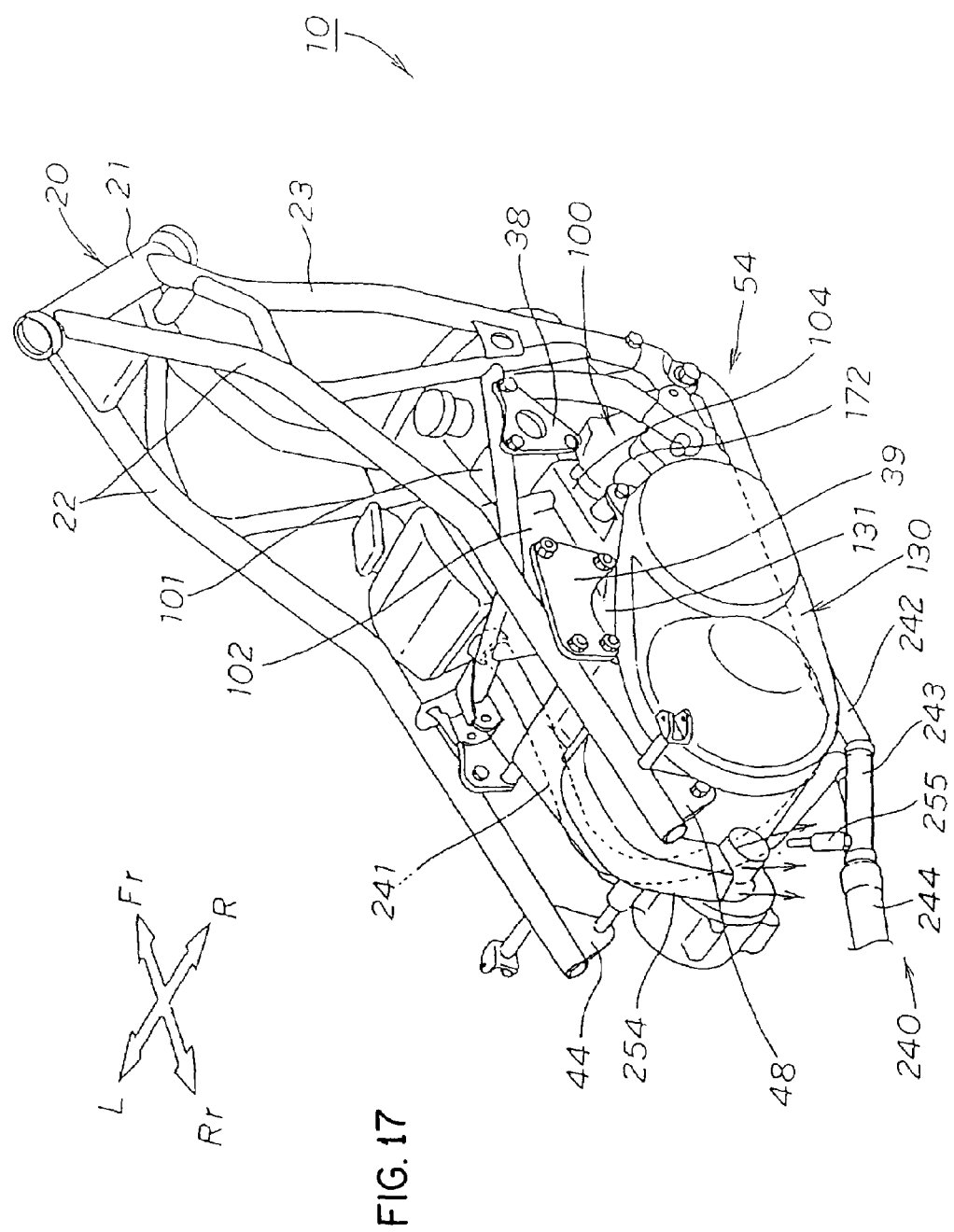
FIG. 17 is a perspective view of the portion around the vehicle body frame and the power unit according to the present invention when viewed from behind on the right side.

Relation between the vehicle body frame 20 and the power unit 54 will now be described. FIG. 14 is a perspective view of the portion around the vehicle body frame and the power unit according to the present invention when viewed from the front on the left side. FIG. 15 is a perspective view of the portion around the vehicle body frame, the power unit, and the air cleaner according to the present invention when viewed from behind on the left side. FIG. 16 is a perspective view of the portion around the vehicle body frame, the power unit, and the air cleaner according to the present invention when viewed from the front on the right side. FIG. 17 is a perspective view of the portion around the vehicle body frame and the power unit according to the present invention when viewed from behind on the right side.

FIG. 14 to FIG. 17 show that the V-shape engine 100 and the transmission unit 130 are suspended from the vehicle body frame 20, which is the diamond shaped-frame.

The V-shape engine 100 is mounted in such a manner that the left side of the crankcase 104 is attached to the vehicle body frame 20 via the left first, second, and third hanger plates 35, 36, 37, and the right side of the crankcase 104 is attached to the vehicle body frame 20 via the right hanger portion 23a and the right first hanger plate 38.

On the other hand, the transmission unit 130 is mounted in such a manner that the upper portion of the left side of the main case 131 is attached to the vehicle body frame 20 via the left third and fourth hanger plates 37, 44 and the upper portion of the right side of the main case 131 is attached to the vehicle body frame 20 via the right second and third hanger plates 39, 48.

The cross members 32, 33 also serve as engine guard member.

Since the vehicle body frame 20 is a diamond-shaped frame and the V-shape engine 100 is suspended from the diamond-shaped frame, the engine 100 may be constructed as part of the vehicle body frame 20. Therefore, it is not necessary to pass the frame member under the V-shape engine 100. Accordingly, the V-shape engine 100 can be lowered to the minimum level from the ground. As a consequence, since the crankshaft 103 of the V-shape engine 100 is lowered as shown in FIG. 9, the space above the low-deck 73 (See FIG. 1) may be increased correspondingly. In addition, by lowering the V-shape engine 100, the low-deck 73 may be disposed above the crankcase 104 and the width of the step (width of the low-deck 73) may be reduced.

Generally, when the crankshaft 103 is lowered, the bank angle θ1 is reduced. According to the layout of the present invention, the bank angle θ1 is secured by employing the V-shape engine 100 having a narrow width.

In this manner, flexibility in mounting of the V-shape engine 100 having the bank angle θ1 of about 90° or larger is further increased. In addition, the center of gravity of the low-deck vehicle 10 may be lowered by lowering the V-shaped engine 100.

Referring to FIG. 9, the description will now be made. The upper frames 22, 22 extend substantially linearly toward the rear to the position near the cylinder 102 of the rear bank of the V-shape engine 100 while inclining downward, and then extend to the position near the pivot (the position of the final output shaft 138) of the rear wheel swing arm 62 with less inclination.

In this manner, the upper frames 22, 22 may be extended substantially linearly in the fore-and-aft direction. Therefore, rigidity of the upper frames 22, 22 may be increased, and thus rigidity of the vehicle body frame 20 may further be increased.

In this manner, the front portions of the upper frames 22, 22 contributes to stability of the air intake structure 190, and the rear portions of the upper frames 22, 22 can receive the load from the rear wheel 63 effectively. Therefore, rigidity of the vehicle body frame 20 may be effectively maintained with a compact and lightweight construction.

As shown in FIG. 15, capacity of the air cleaner 56 may be increased by allowing the left and the right first reinforcing members 24, 24 in the vehicle body frame 20 to curve outward. In addition, even when the air cleaner 56 is disposed at the front, it is prevented from interfering the head pipe 21 or from interfering with the maximum pivoting range of the front fork 51 (See FIG. 2).

In FIG. 15, reference numeral 148 designates a stepless-change-gear-ratio-variable servomotor for controlling the stepless change-gear-ratio of the belt-type stepless transmission mechanism 141 via the speed change gear 147 shown in FIG. 11. In FIG. 16, reference numeral 121 designates an engine coolant pump. FIG. 16 and FIG. 17 show that the bracket 172 on the upper right portion of the transmission unit 130 is removably mounted to the right side of the crankcase 104.

As shown in FIG. 9, the crankcase 104 and the transmission unit 130 are connected with each other by the left third hanger plate 37 and a connecting member 173 at the upper and lower positions, and the left third hanger plate 37 and the connecting member 173 are provided on the opening side of the angular C-shape in plan view of the power unit 54. The left third hanger plate 37 serves as a connecting member.

More specifically, the front portion of the connecting member 173 is attached to the lower portion of the left rear of the crankcase 104 with two bolts 174, 174, and the rear portion of the connecting member 173 is attached to the lower portion of the left front of the transmission unit 130 with a single bolt 175.

The front portion of the left third hanger plate 37 (connecting member 37) is attached to the upper portion of the left rear of the crankcase 104 with a single bolt 178, and the rear portion of the left third hanger plate 37 is attached to the upper portion of the left front of the transmission unit 130 with a single bolt 179.

With this arrangement, rigidity of the power unit 54 may be secured sufficiently. Therefore, since rigidity of the power unit 54 including the engine 100 and the transmission unit 130, which is part of the vehicle body frame 20, is increased, rigidity of the vehicle body frame 20 can further be increased as well.

In addition, since the opened portion can be reinforced by the upper and the lower connecting members 37, 173 by providing the upper and lower connecting member 37, 173 on the side of the opening in angular C-shape in plan view of the power unit 54, desired rigidity can be secured effectively, flexibility in provision of rigidity is increased, and appearance of the low-deck vehicle 10 is improved since the connecting members 37, 173 do not project from the vehicle body.

In addition, the connecting member 173 is constructed to hold a main stand (stand member) 176 as shown in FIG. 4 to FIG. 6. In other words, the main stand 176 is mounted so as to be capable of standing and being retracted by connecting the upper left portion of the main stand 176 in substantially inverted angular U-shape in front view to the lower end of the connecting member 173, and connecting the upper right portion of the main stand 176 to the lower portion of the transmission unit 130 via a stay 177.

Since the connecting member 173 for securing rigidity of the power unit 54 also contributes to hold the main stand 176, shared use with other functional components is achieved, and thus the light weight and compact low-deck vehicle 10 with less number of components is achieved.

Figure 18:
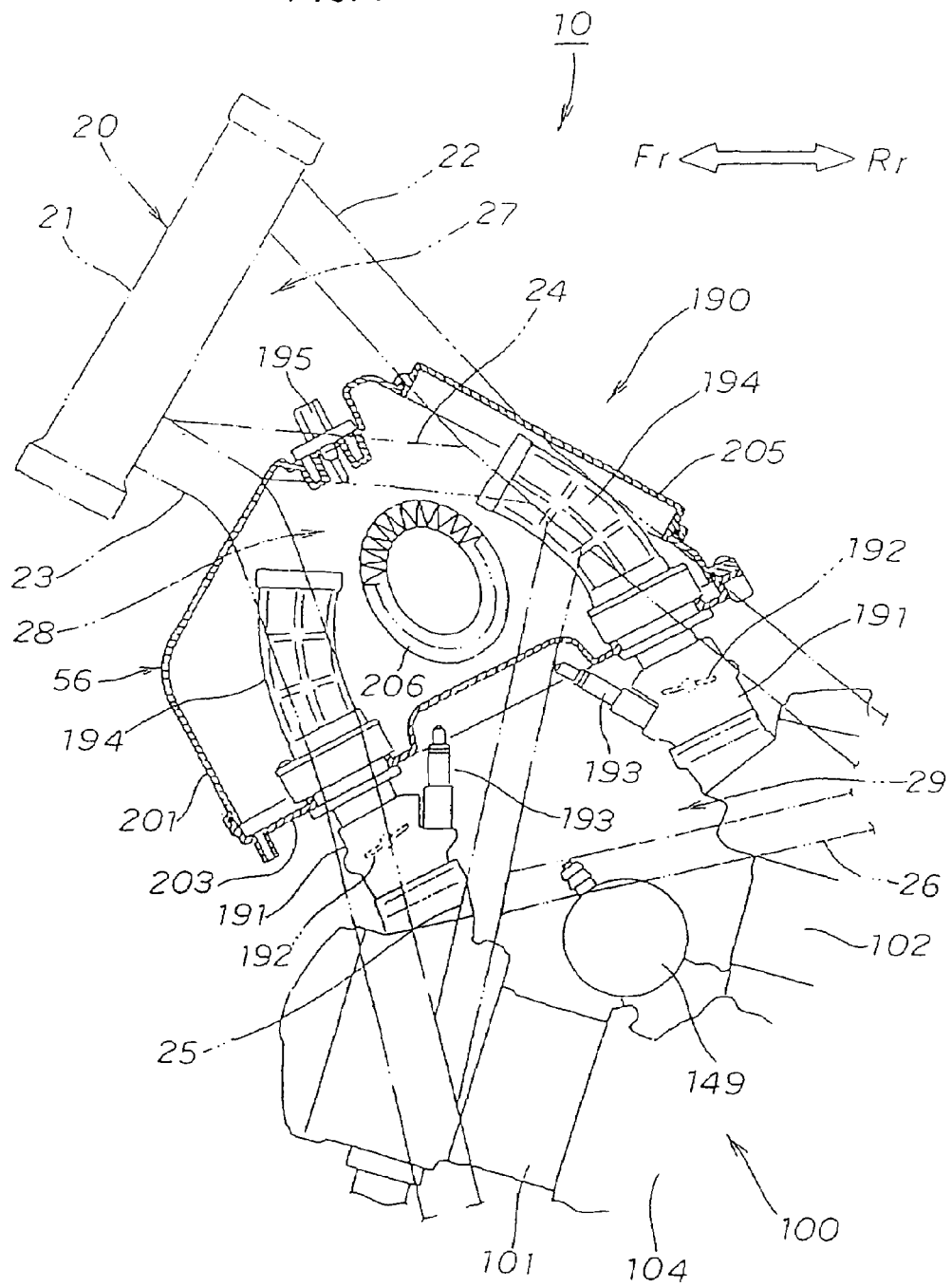
FIG. 18 is a left side view of the portion around the vehicle body frame, a V-shape engine, and an air intake structure according to the present invention.
Figure 19:
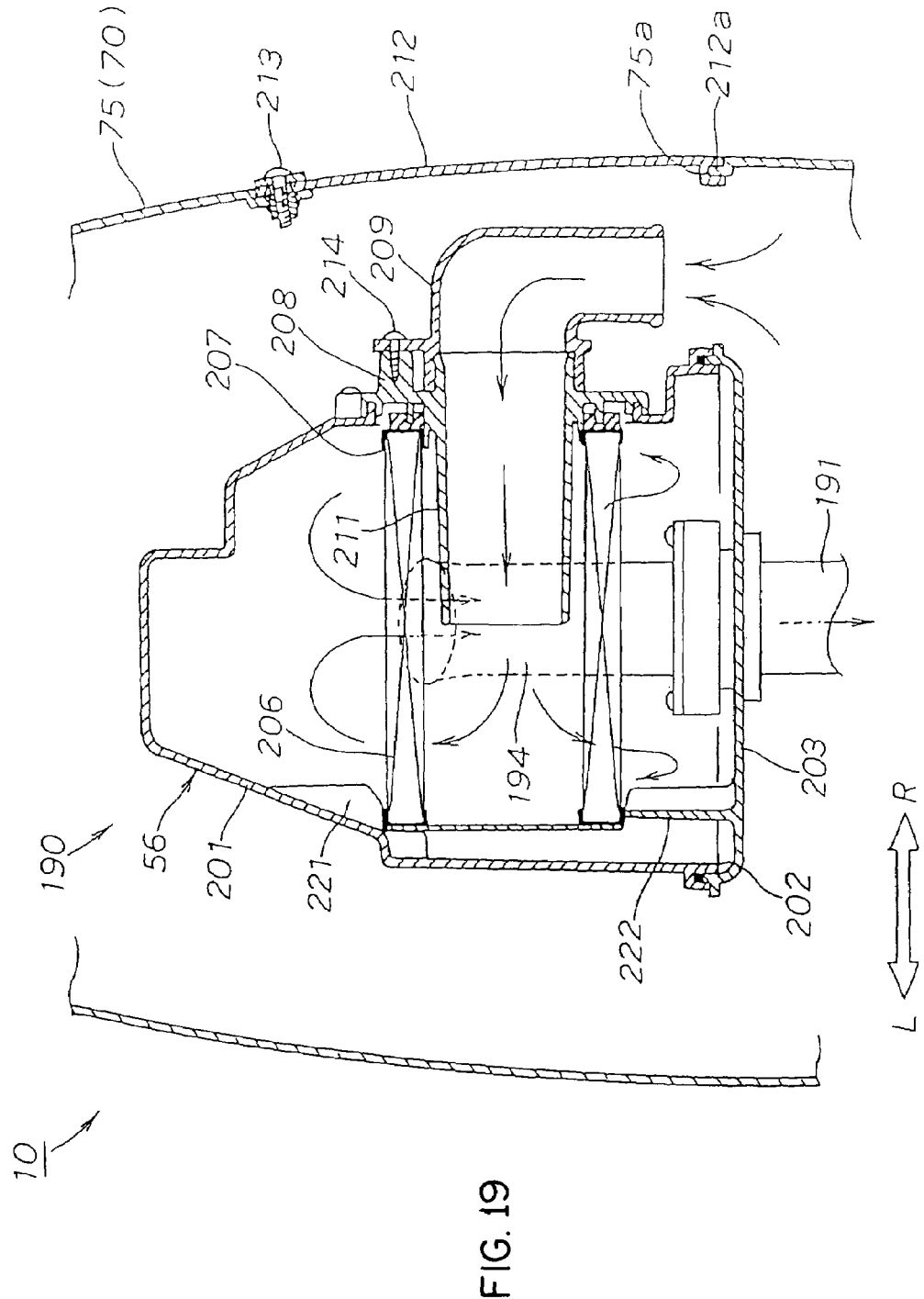
FIG. 19 is a cross-sectional back view around the air cleaner and a vehicle body cover according to the present invention.
Figure 20:
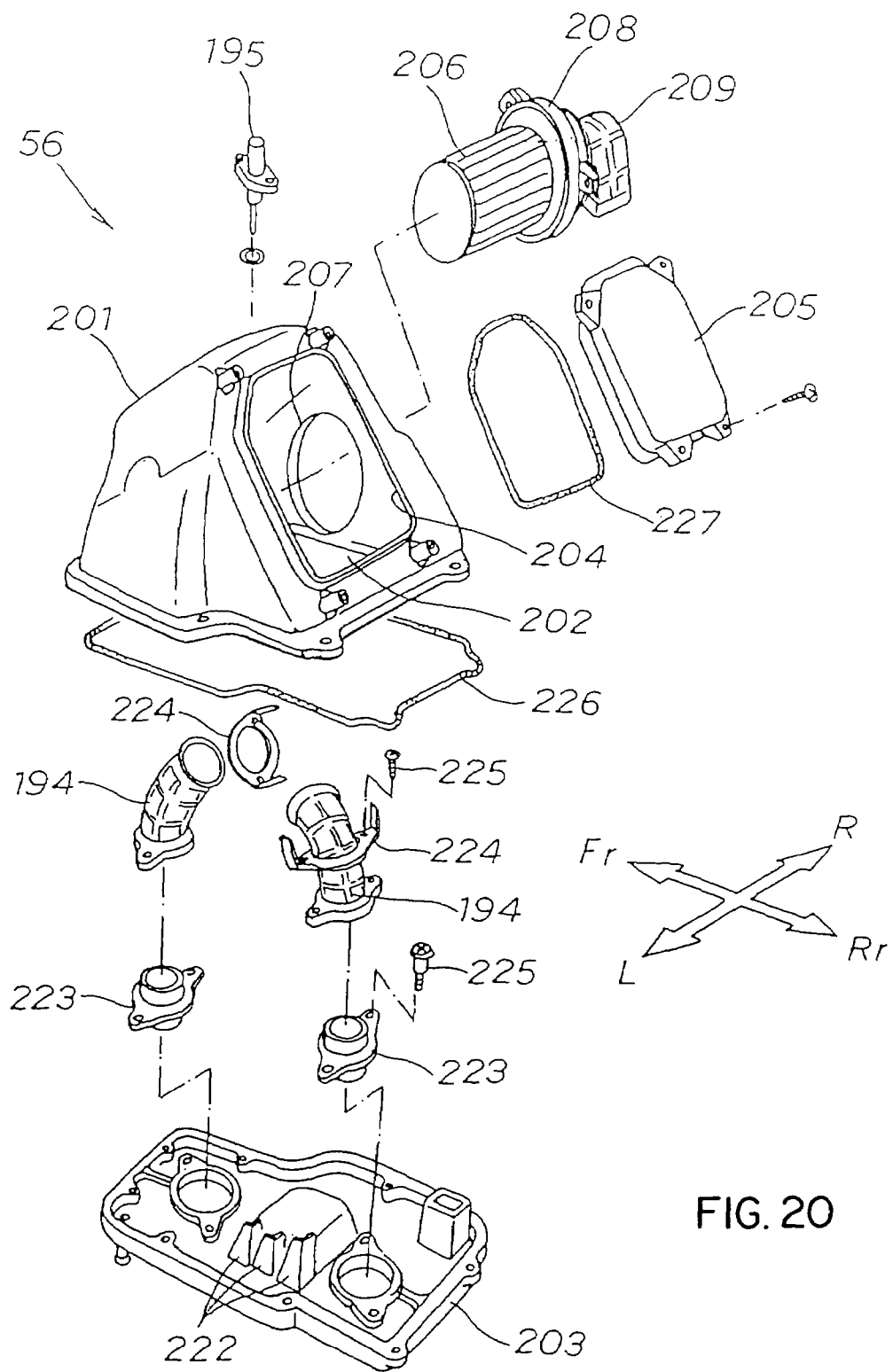
FIG. 20 is an exploded view of the air cleaner according to the present invention.
Figure 21:
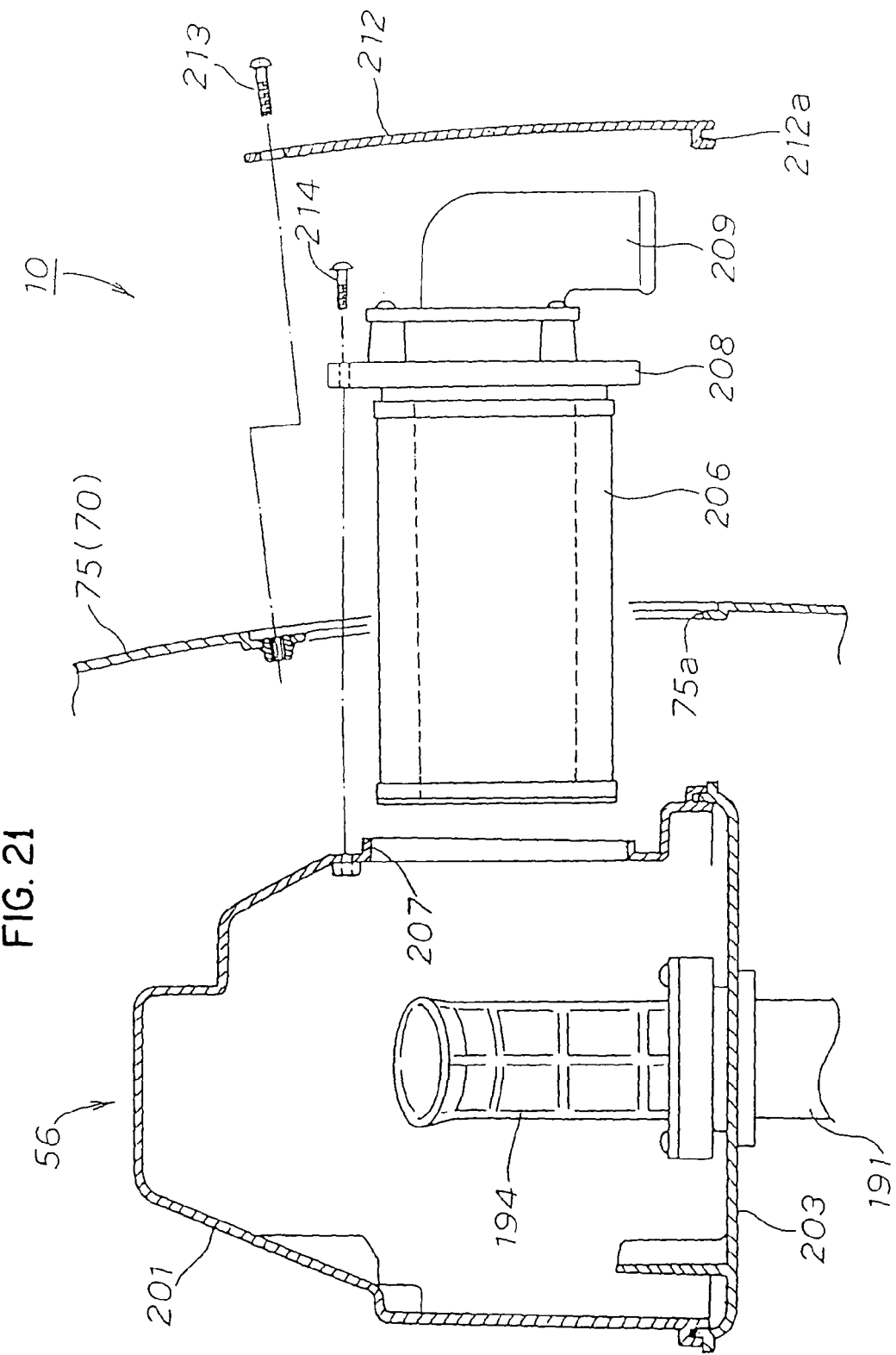
FIG. 21 is a drawing illustrating the operation of the air cleaner according to the present invention.

Subsequently, the air intake structure 190 will be described. FIG. 18 is a left side view of the portion around the vehicle body frame, the V-shape engine, and the air intake structure according to the present invention, showing the air cleaner 56 in cross section. FIG. 19 is a cross-sectional back view around the air cleaner and the vehicle body cover according to the present invention, FIG. 20 is an exploded view of the air cleaner according to the present invention, and FIG. 21 is a drawing illustrating the operation of the air cleaner according to the present invention.

Referring now to FIG. 9 and FIG. 18, a state in which the air intake structure 190 including the air intake connecting hoses 191, 191 and the air cleaner 56 is disposed upwardly of the V-shape engine 100, and the space S2 for disposing the fuel tank 57 as vehicle accessories is provided above the air cleaner 56.

More specifically, the air intake structure 190 is disposed between the V-shaped banks (between the cylinders 101, 102) of the V-shape engine 100 so as to be oriented toward the head pipe 21, and the fuel tank 57 is disposed above the air intake structure 190.

More specifically, the V-shape engine 100 includes the air intake connecting hoses 191, 191 for connecting the cylinders 101, 102 to the air cleaner 56, respectively. The air intake connecting hoses 191, 191 are provided with throttle valves 192, 192 and fuel injection valves 193, 193, respectively, and with air lines 194, 194 (funnels) extending in the air cleaner 56, respectively. The air lines 194, 194 are connected to the respective one ends of the air intake connecting hoses 191, 191, and arranged so that the upper ends thereof approach to each other when viewed from the side. The filter element 206 is disposed between these air lines 194, 194.

In the drawing, reference numeral 149 designates a cell motor. Numeral 195 designates an intake air temperature sensor for detecting the temperature of intake air in the air cleaner 56, which is used for correcting the value at the temperature of the intake air when arithmetically controlling the amount of injection of the fuel injection valves 193, 193.

As shown in FIG. 18 to FIG. 20, the air cleaner 56 is constructed so as to be capable of being maintained and inspected from the side of the low-deck vehicle 10. The specific construction of the air cleaner 56 includes a cleaner case 201, a removable bottom plate 203 for closing a lower end opening 202 of the cleaner case 201, two air lines 194, 194 extending from the bottom plate 203 to the interior of the case, a removable inspection lid 205 for closing an inspection port 204 provided at the upper rear portion of the cleaner case 201, the cylindrical filter element 206 stored in the interior of the cleaner case 201, a filter inspection hole provided on the left side and the right side of the cleaner case 201, a removable lid member 208 for closing the filter inspection hole 207, and a substantially L-shaped air intake tube 209 provided on the lid member 208.

The lid member 208 includes the air intake tube 209 detachably attached at one end thereto, a communicating tube 211 communicating with the air intake tube 209, and the filter element 206 communicating with the communicating tube 211 detachably attached thereto at one end. In this manner, the air cleaner 56 is provided with the filter element 206 in the interior thereof so as to be detachably by the lid member 208 provided on the side of the air cleaner 56.

The center cover 75 (part of the vehicle body cover 70) covering the air cleaner 56 is provided with an inspection hole 75a and a detachable inspection lid 212 for closing the inspection hole 75a. The inspection lid 212 is located at the position facing the lid member 208.

Air taken through the air intake tube 209 passes through the communicating tube 211, the filter element 206, the cleaner case 201, the air lines 194, 194, the air intake connecting hoses 191, 191, and is flown in to the cylinders 101, 102 of the V-shape engine 100 shown in FIG. 8.

In order to maintain and inspect the filter element 206, as shown in FIG. 21, a screw 213 is removed, and a locking groove 212a at an end of the inspection lid 212 is pulled out from the edge of the inspection hole 75a. The inspection lid 212 can now be removed from the center cover 75.

Subsequently, a screw 214 is removed and the lid member 208 is removed through the inspection hole 75a. Consequently, the air intake tube 209 and the filter element 206 can also be removed together with the lid member 208.

In order to restore the filter element 206, the reverse procedure to the removal procedure described above must simply be followed.

As is clear from the description above, since the air cleaner 56 is constructed so as to be capable of being maintained and inspected from the side of the low-deck vehicle 10, it is not necessary to perform maintenance and inspection from above the air cleaner 56. Therefore, a sufficiently large space that can be effectively used may be secured above the air cleaner 56.

Furthermore, since the filter element 206 disposed in the interior of the air cleaner 56 is constructed to be detachable by the lid member 208 on the side of the air cleaner 56 and the inspection lid 212 opposing the lid member 208 is provide on the vehicle body cover 70 for covering the air cleaner 56, the filter element 206 can easily be attached and detached from the side of the air cleaner 56 by removing the lid member 208 after the inspection lid 212 is removed. Therefore, maintenance and inspection work for the filter element 206 can be performed easily and thus workability is improved.

In addition, as shown in FIG. 18, since the filter element 206 is disposed between the plurality of air lines 194, 194 extending in the interior of the air cleaner 56, the filter element 206 does not interfere with the air lines 194, 194 when attaching and detaching the filter element 206 to/from the side of the air cleaner 56. Therefore, it is not necessary to increase the size of the air cleaner 56 for preventing interference. As a consequence, the air cleaner 56 may be downsized, and thus flexibility of design in mounting the air cleaner 56 to the low-deck vehicle 10 is increased.

Since the space S2 for disposing the vehicle accessories such as the fuel tank 57 (See FIG. 9) is provided above the air cleaner, the vehicle accessories can easily be arranged utilizing the space S2 effectively, and flexibility of design in distribution of the load can be improved. For example, since the center of gravity may be set at the front of the low-deck vehicle 10 by arranging the air cleaner 56 and the fuel tank 57 in front of the low-deck vehicle 10, the load exerted on the front wheel 52 and the rear wheel 63 can be distributed further suitably.

The respective air intake connecting hoses 191, 191 are characterized by being disposed substantially along the upper frame 22 and the down frame 23 as shown in FIG. 18. In other words, the air intake connecting hose 191 connected to the cylinder 101 of the front bank is disposed so as to lie substantially along the down frame 23, and the air intake connecting hose 191 connected to the cylinder 102 of the rear bank is disposed so as to lie substantially along the upper frame 22.

Therefore, the air intake connecting hoses 191, 191 may be constructed substantially linearly. Air may be supplied more smoothly from the air intake connecting hoses 191, 191 to the respective cylinders 101, 102 by employing the substantially linear air intake connecting hoses 191, 191. As a consequence, air intake efficiency may further be improved, and thus the output performance of the V-shape engine 100 may further be improved.

In addition, in this arrangement, the space inside the vehicle body frame 20 can be utilized effectively to achieve compact arrangement, flexibility in designing may be increased, and the appearance of the low-deck vehicle 10 may be improved. In addition, ease of straddling the vehicle body frame 20 when the driver rides on the vehicle is improved.

As described above, between the upper frames 22 and the down frames 23 facing the sides of the respective air intake connecting hoses 191, 191 are of a trussed frame structure. Therefore, rigidity of the respective air intake connecting hoses 191, 191 of the vehicle body frame 20 in the longitudinal direction can further be improved. Therefore, the output performance of the V-shape engine 100 suspended by the vehicle body frame 20 may further be improved.

The triangular second space 28 in the trussed frame structure is a space where the filter element 206 of the air cleaner 56 can be taken in and out. Since the second space 28 is present, the filter element 206 can easily be attached and detached from the side of the air cleaner 56. Therefore, maintenance and inspection work for the filter element 206 can easily be performed, and thus workability is improved. In addition, the compact and lightweight air cleaner 56 is achieved.

In FIG. 19, reference numerals 221, 222 designate element holding members. In FIG. 20, reference numerals 223, 223 designate air line connecting joints, numerals 224, 224 designate air line connecting flanges, numeral 225 . . . designate screws, and numerals 226, 227 designate packing.

Figure 22:
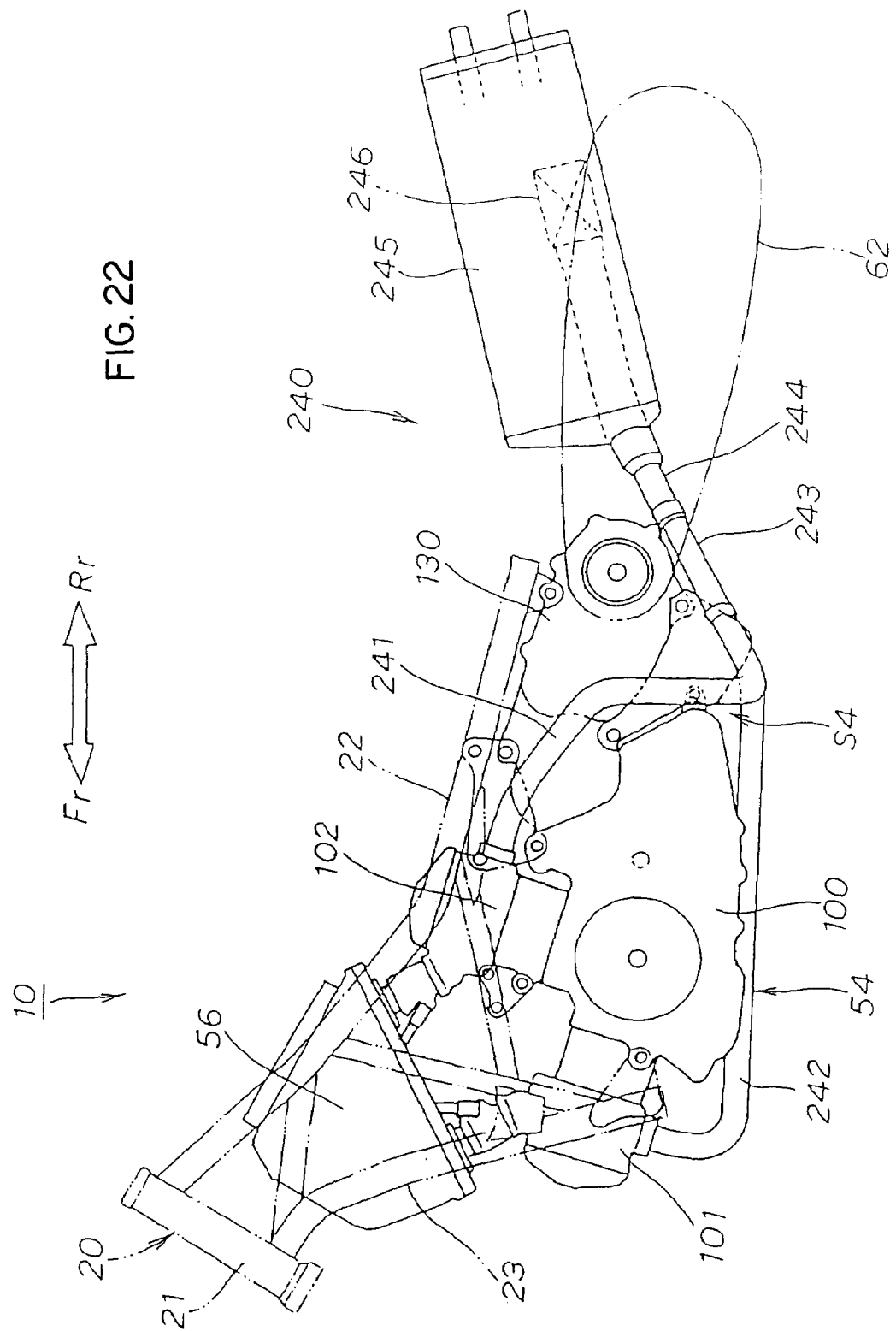
FIG. 22 is a left side view of the portion around the vehicle body frame, the power unit, and an exhaust system according to the present invention.
Figure 23:
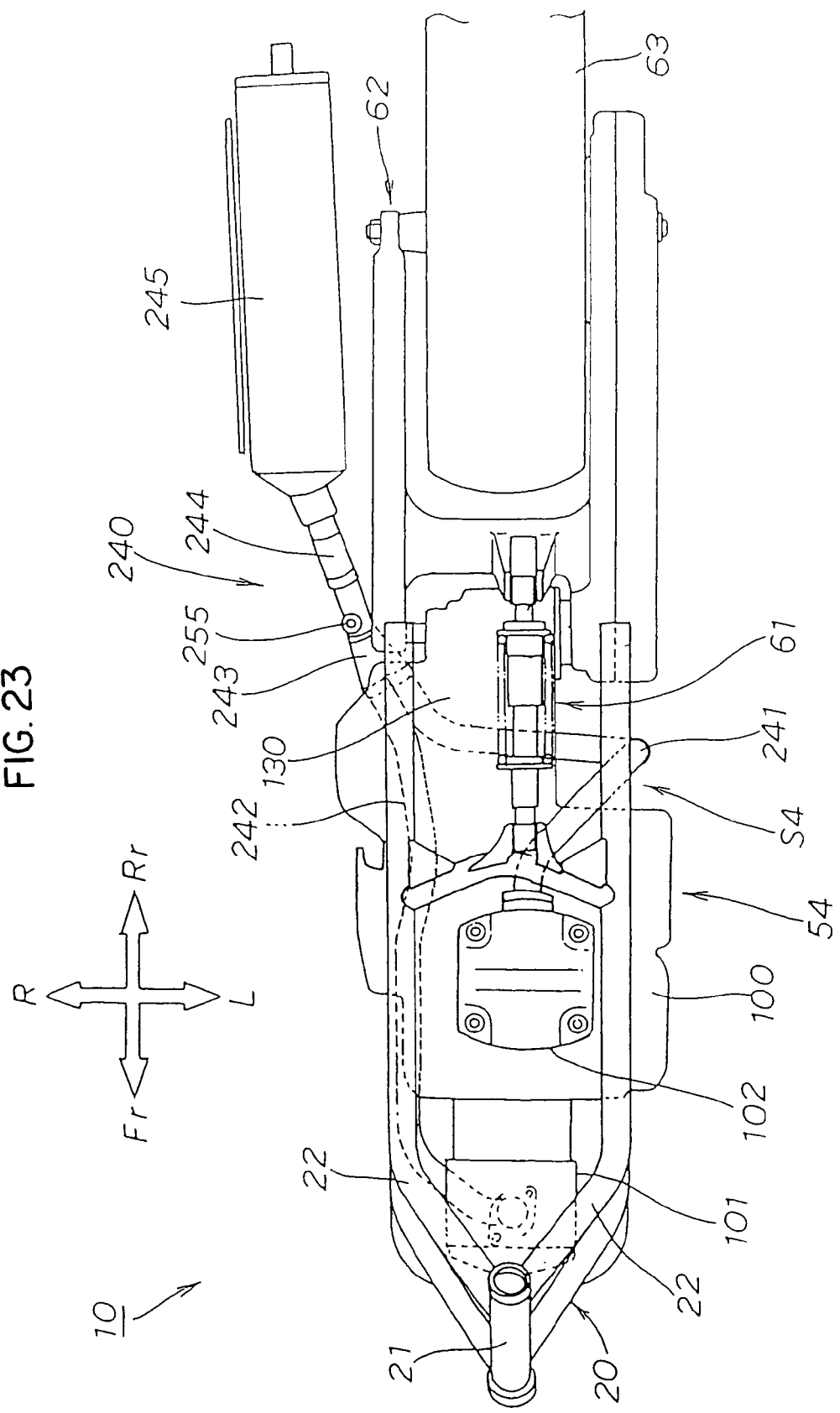
FIG. 23 is a plan view of the portion around the vehicle body frame, the power unit, and the exhaust system according to the present invention.

Subsequently, an exhaust system 240 of the V-shape engine 100 will be described. FIG. 22 is a left side view of the portion around the vehicle body frame, the power unit, and the exhaust system according to the present invention. FIG. 23 is a plan view of the portion around the vehicle body frame, the power unit, and the exhaust system according to the present invention.

Referring now to FIG. 14 to FIG. 17, the exhaust system 240 of the V-shape engine 100 includes a first exhaust pipe 241 connected to the cylinder 102 of the rear bank, a second exhaust pipe 242 connected to the cylinder 101 of the front bank, a collecting duct 243 for collecting the rear end of the first exhaust pipe 241 and the rear end of the second exhaust pipe 242, and muffling pipe 245 connected to the rear end of the collecting duct 243 via an extension pipe 244. The muffling pipe 245 includes a catalyst 246 (See FIG. 22) integrated therein and is disposed on the upper right side of the rear wheel 63.

The first exhaust pipe 241 connected to the cylinder 102 of the rear bank extends rearwardly of the cylinder 102 of the rear bank (more specifically, leftward and rearward), and then the rear end is extended downwardly, passed through a space S4 at the opening of the substantially angular C-shape in plan view of the power unit 54, then extended from the lower end rearward (more specifically, rightward and rearward) to be passed under the power unit 54, and then connected to the second exhaust pipe 242 at the rear end thereof via the collecting duct 243.

Since the first exhaust pipe 241 connected to the cylinder 102 of the rear bank of the V-shape engine 100 is passed through the space S4 at the opening of substantially angular C-shape in plan view of the power unit 54, the space S4 at the opening in the angular C-shape can be used effectively. Therefore, since the first exhaust pipe 241 does not project from the vehicle body, appearance of the low-deck vehicle 10 is improved.

The second exhaust pipe 242 connected to the cylinder 101 of the front bank extends downward from the cylinder 101 of the front bank, and then extends rightward from the lower end thereof, and extends rearward from the right end thereof along the lower right portion of the power unit 54, and is connected to the collecting duct 243 at the rear rend thereof.

As shown in FIG. 14, the second exhaust pipe 242 passes on one side (right side) of the front surface of the V-shape engine 100, and the crankcase 104 on the front surface on the other end (left side) of the V-shape engine 100 is provided with an oil filter 122 and/or an oil cooler 123. In other words, the oil filter 122 or the oil cooler 123 is provided at the front portion of the left half of the crankcase 104.

As shown in FIG. 11, the transmission unit 130 is provided with an air intake port 251 on the right side thereof, and a fan 253 on a pulley 252 of the belt-type stepless transmission mechanism 141, so that outside air is sucked into the transmission unit 130 to cool it by air. Discharged air after having used for cooling is discharged into the atmosphere by an air discharging member 254 provided on the upper rear portion of the transmission unit 130 as shown in FIG. 14 to FIG. 16.

The air discharging member 254 is inverted U-shaped duct in side view, and is constructed so as to blow discharged air onto the first and the second exhaust pipes 241, 242. The portion of the first and the second exhaust pipes 241, 242 on which discharged air is blown are the portion where the first exhaust pipe 241 and the second exhaust pipe 242 are collected, that is, the collecting duct 243 or in the vicinity thereof. The exhaust air sensor 255 is provided at the portion of the first and the second exhaust pipes 241, 242 on which discharged air is blown. In other words, the exhaust air sensor 255 is provided at the rear portion of the collecting duct 243. Since the exhaust air sensor 255 is cooled by discharged air, functions or the performances of the exhaust air sensor 255 are advantageously maintained.

The exhaust air sensor 255 detects the amount of oxygen in the exhaust gas. The amount of injection of the fuel injection valves 193, 193 (See FIG. 18) can be feedback-controlled based on the detected data. For example, when a large amount of oxygen is detected, it is recognized that the ratio of the amount of fuel supply is small with respect to the amount of supplied air, and thus fuel injection valves 193, 193 are controlled so as to increase the amount of injection.

In this manner, since the exhaust air sensor 255 is provided at the portion of the first and the second exhaust pipes 241, 242 on which discharged air is blown, the exhaust air sensor 255 can be cooled by discharged air. Since the heat influence of the exhaust gas on the exhaust air sensor 255 may be reduced, it is advantageous in maintaining the functions or the performances of the exhaust air sensor 255. For example, it is possible to control fuel injection of the fuel injection valves 193, 193 (See FIG. 18) constantly suitably by the exhaust air sensor 255.

The exhaust system 240 described above will be described collectively below.

Since the power unit 54 is constructed in the substantially angular C-shape in plan view, the first exhaust pipe 241 connected to the cylinder 102 of the rear bank of the V-shape engine 100 extends rearwardly of the cylinder 102, and then extends downward from the rear end thereof through the space S4 at the opening of the substantially angular C-shape in plan view, and then extends rearward from the lower end thereof to be connected at the rear end to the second exhaust pipe 242 connected to the cylinder 101 of the front bank of the V-shape engine 100.

In this manner, the first exhaust pipe 241 connected to the cylinder 102 of the rear bank can be connected to the second exhaust pipe 242 connected to the cylinder 101 of the front bank utilizing the space S4 effectively by being passed over the power unit 54 and then being passed downwardly through the space S4 of the opening at the substantially angular C-shape in plan view. Therefore, the plurality of exhaust pipes for the engine shaped like a letter V in the fore-and-aft direction can be disposed efficiently.

Furthermore, since it is constructed to blow discharged air from the air discharging member 254 provided at the rear of the transmission unit 130 onto the first and the second exhaust pipes 241, 242, the first and the second exhaust pipes 241, 242 and exhaust gas in the pipe may be controlled to a desired temperature by discharged air. In particular, by cooling the first and the second exhaust pipes 241, 242 or exhaust gas by discharged air which have cooled the transmission unit 130, both of them can be cooled at the same time. Therefore, it is not necessary to provide a separate cooling unit and thus compact low-deck vehicle 10 may be achieved.

Furthermore, since discharged air from the air discharging member 254 is blown onto the portion in the vicinity the position where the first exhaust pipe 241 and the second exhaust pipe 242 are collected, exhaust gas in the first and the second exhaust pipes 241, 242 can be cooled together for temperature control, efficiency is improved.

As shown in FIG. 14, the second exhaust pipe 242 is passed through one side of the front surface of the V-shape engine 100. However, the first and the second exhaust pipes 241, 242 are not passed through the crankcase 104 on the other side of the front surface of the V-shape engine 100. Utilizing a free space through which the exhaust pipes 241, 242 do not pass, the oil filter 122 or the oil cooler 123, which are functional components of the oil lubrication and cooling system for an engine can be provided in the crankcase 104 on the other side of the front surface of the V-shape engine 100. Therefore, compact low-deck vehicle 10 is achieved.

Subsequently, arrangement of the rear cushion 61 for a rear wheel will be described.

Figure 24:
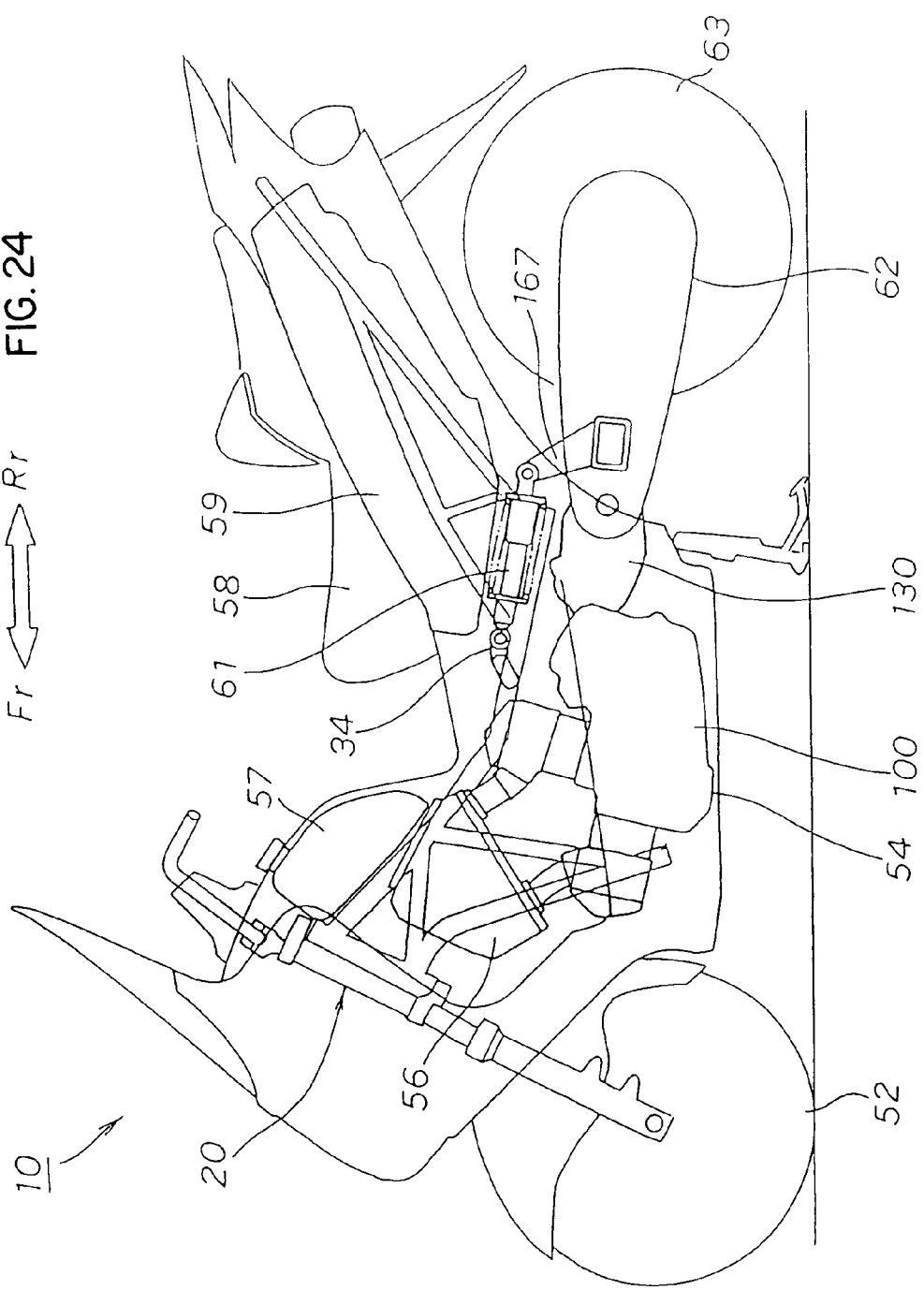
FIG. 24 is a schematic drawing of the low-deck vehicle according to the present invention.

FIG. 24 is a schematic drawing of the low-deck vehicle according to the present invention, showing that the storage box 59 having substantially the same fore-and-aft length as the fore-and-aft length of the seat 58 is provided under the seat 58, and the rear cushion 61 for a rear wheel is laterally disposed under the storage box 59. Referring to FIG. 13, it is obvious that the rear cushion 61 is disposed at the substantially center of the vehicle body (laterally center).

Figure 25:
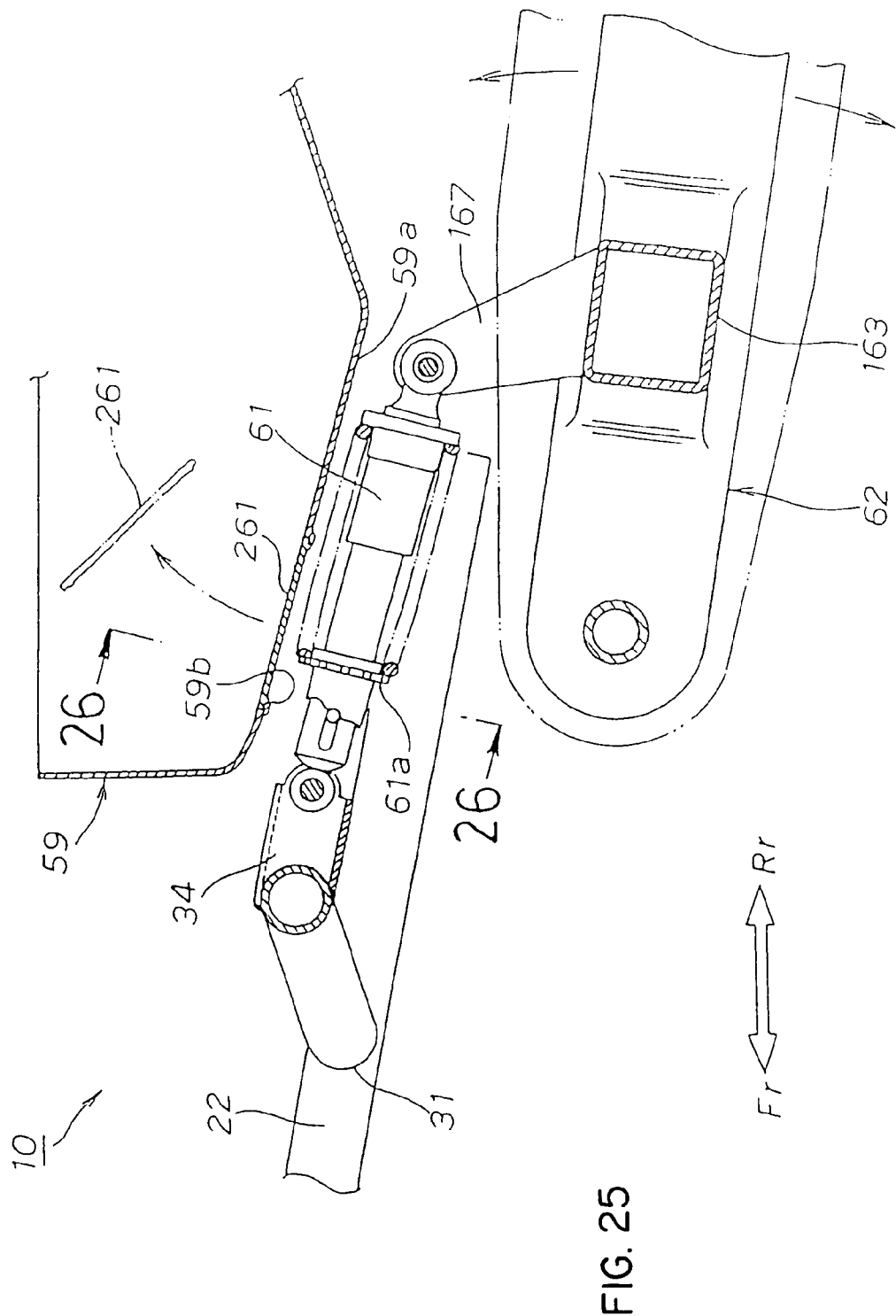
FIG. 25 is a left side view of the portion around a storage box and a rear cushion for a rear wheel according to the present invention.
Figure 26:
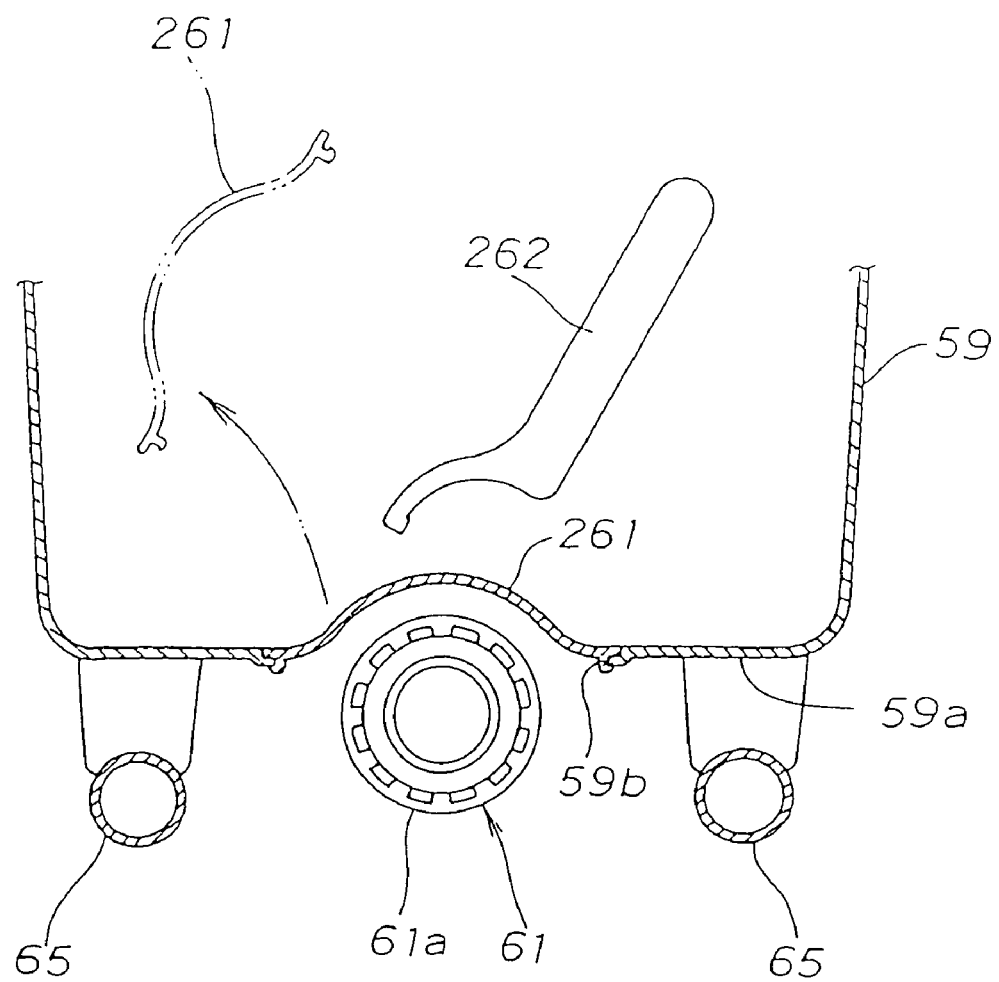
FIG. 26 is a cross-sectional view taken along the line 26—26 in FIG. 25.

FIG. 25 is a left side view of the portion around the storage box and the rear cushion for a rear wheel according to the present invention, and FIG. 26 is a cross-sectional view taken along the line 26—26 in FIG. 25.

The rear cushion 61 for a rear wheel is disposed along the rear portion of the upper frame 22. More specifically, one end of the rear cushion 61 is connected to the cushion bracket 34 of the upper frame 22, and the other end of the rear cushion 61 is connected to the cushion bracket 167 of the swing arm 62, so that the rear cushion 61 is disposed above the upper frame 22 substantially in parallel with the upper frame 22.

The storage box 59 is provided with an inspection lid 261 for the rear cushion 61 at a bottom surface 59a thereof. The rear cushion 61 is provided with an adjusting member 61a for adjusting cushioning property. The bottom surface 59a of the storage box 59 is located directly above the adjusting member 61a.

When adjusting the rear cushion 61, the inspection lid 261 detachably mounted to the bottom surface 59a by resilient engagement is removed, and a tool 262 is inserted through an inspection hole 59b of the bottom surface 59a for adjusting the adjusting member 61a. The adjusting work is easy.

The mounting structure of the rear cushion 61 will be described collectively below. Since the rear cushion 61 for a rear wheel is laterally disposed below the storage box 59, even when the storage box 59 is extended in the fore-and-aft direction, it does not interfere with the rear cushion 61 for a rear wheel located at the substantially center of the vehicle body. Therefore, the storage box 59 having substantially the same fore-and-aft length as the fore-and-aft length of the seat 58 may be disposed under the seat 58. Therefore, a storage space for storing an object which is long and large in diameter can easily be secured by upsizing the storage space by increasing the fore-and-aft length of the storage box 59.

Furthermore, since the inspection lid 261 of the rear cushion 61 for a rear wheel is provided on the bottom surface of the storage box 59, maintenance and inspection of the rear cushion 61 may be performed by removing the inspection lid 261. Since maintenance and inspection work can be performed easily without removing the storage box 59 or the vehicle body cover 70 (See FIG. 1), workability is improved.

In addition, since the rear cushion 61 for a rear wheel is disposed along the rear portion of the upper frame 22 of the diamond-shaped frame 20, rigidity of the rear cushion 61 for a rear wheel can be sufficiently secured by the upper frame 22 having high rigidity, and compact suspension structure is achieved.

Figure 27:
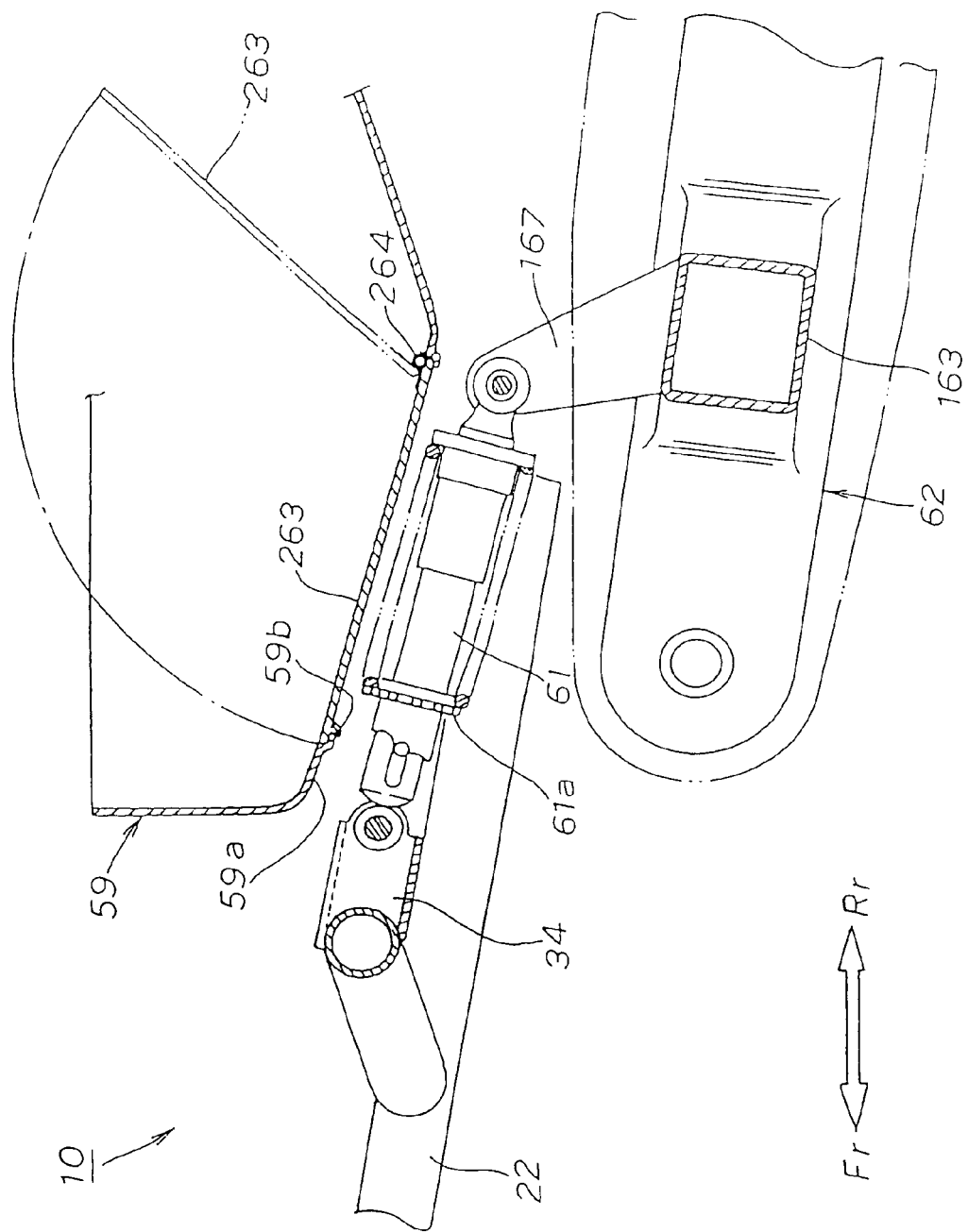
FIG. 27 is a drawing of a modification of the storage box according to the present invention
Figure 28:
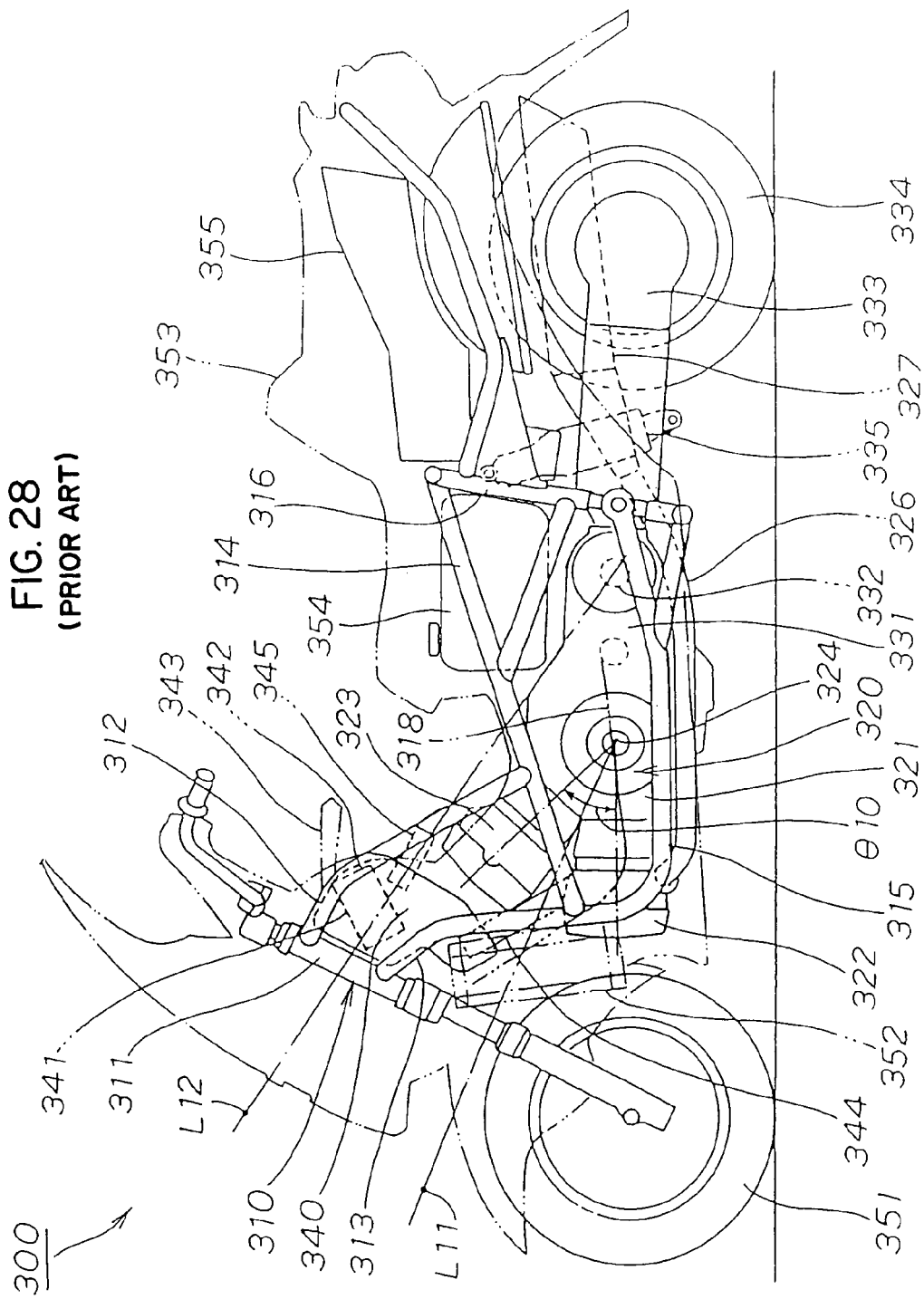
FIG. 28 is a schematic drawing of a low-deck vehicle according to the related art.

FIG. 27 is a drawing of a modification of the storage box according to the present invention, which corresponds to the embodiment shown in FIG. 25. The storage box 59 in the modification is characterized in that an inspection lid 263 provided on the bottom surface 59a is a hinged structure that is opened and closed via a hinge 264. Since other constructions are the same as those shown in FIG. 24 to FIG. 26, the same reference numerals are allocated thereto, and will not be described.

While the invention has been described in particular embodiments, it is to be understood that the words which have been used are words of description rather than limitation and that changes within the purview of the appended claims may be made without departing from the true scope and spirit of the invention in its broader aspects.

I claim:

1. A low-deck vehicle comprising: an engine shaped like a letter V in the fore-and-aft direction suspended by upper frames extending from a head pipe rearward and downward and down frames extending from the head pipe downward; and an air intake structure of the engine including air intake connecting hoses and an air cleaner disposed above the V-shape engine,
    wherein the air intake connecting hoses are disposed between V-shaped banks of the engine, the air intake connecting hoses are disposed substantially along at least one of the upper frames and at least one of the down frames, and the air intake connecting hoses do not extend above the upper frames.

2. The low-deck vehicle according to claim 1, wherein spaces are defined between the upper frames and the down frames facing the sides of the respective air intake connecting hoses, and the spaces are of a trussed frame structure.

3. The low-deck vehicle according to claim 2, wherein the trussed frame structure includes a triangular space where a filter element of the air cleaner can be taken in and out.

4. The low-deck vehicle according to claim 1, wherein the upper frames extend substantially linearly toward the rear to the position near a cylinder of a rear bank of the V-shape engine while inclining downward, and then extend to the position near a pivot of a rear wheel swing arm with less inclination.

5. The low-deck vehicle according to claim 1, comprising a radiator of the engine disposed forwardly of the head pipe.

* * * * *